US006319535B1

(12) United States Patent
Shaw

(10) Patent No.: US 6,319,535 B1
(45) Date of Patent: Nov. 20, 2001

(54) CONFECTIONS THAT "SWIM" IN A CARBONATED BEVERAGE

(76) Inventor: Laurence J. Shaw, 338 Third Ave., Apt. #1, San Francisco, CA (US) 94118

( * ) Notice: Subject to any disclaimer, the term of this patent is extended or adjusted under 35 U.S.C. 154(b) by 0 days.

(21) Appl. No.: 09/429,195

(22) Filed: Oct. 28, 1999

Related U.S. Application Data

(63) Continuation-in-part of application No. 09/087,042, filed on May 29, 1998, now abandoned, which is a continuation-in-part of application No. 08/756,725, filed on Nov. 26, 1998, now abandoned
(60) Provisional application No. 60/010,736, filed on Jan. 29, 1996, and provisional application No. 60/007,655, filed on Nov. 28, 1995.

(51) Int. Cl.$^7$ ................ A23L 1/06; A23L 1/05; A23G 3/00; A63H 23/00
(52) U.S. Cl. ............ 426/573; 426/576; 426/660; 446/153
(58) Field of Search .................... 426/576, 590, 426/660, 573; D01/127; 446/153, 159, 156

(56) References Cited

U.S. PATENT DOCUMENTS

| 2,932,916 | 4/1960 | Strickland | 46/92 |
| 4,198,780 | 4/1980 | Kubiatowicz | 46/92 |

OTHER PUBLICATIONS

Taylor. In Step Into Science: Sink or Swim, p. 22, Random House, New York, 1981.*
Van Cleave. In Physics for Every Kid, pp. 64–65, John Wiley & Sons, 1991.*
*Crain's New York Business*, May 20–26 1996, "Gel Balls You Can Drink", vol. XII, No. 21.
Orbitz press release, 1996 (4 pp.), http//www.orbitz.com.
Undersea Explorer packaging, DaMert Company, California, 1993.
On the Size Range of Active Nucleation Cavities on a Heating Surface, Y. Y. Hsu, Journal of Heat Transfer, Aug. 1962, pp. 207–216.
*Surface Chemistry of Froth Flotation*, Jan Leja, Plenum Press, New York, 1982, pp. v–xxi, 1–15, 24–31, 106–131, 186–195, 549–559, 578–585, 592–597, and jacket blurb.

* cited by examiner

*Primary Examiner*—Lisa B. Arthur

(57) ABSTRACT

An edible confection with a recognizable shape which repeatedly rises and sinks, i.e., "swims," in a transparent carbonated beverage due to changing buoyancy resulting from the formation of carbonation bubbles on the surface of the confection, and the escape of the bubbles to the atmosphere when the confection reaches the top of the beverage. The ability of the confection to ascend and descend is determined by the density, volume and surface area of the confection, and the volume per unit surface area of bubbles which form on the confection. For a thin confection the conditions for ascension and descension are substantially independent of the dimensions other than the thickness. Bubble nucleation is promoted by a surface which is rough on small length scales, and large bubbles can be retained on the surface if the confection is smooth on larger length scales. A low solubility confection is preferred because the dimensions of the confection and its surface properties are relatively invariant with time, and the submerged confection has little effect on the appearance and the level of carbonation of the beverage. The number of confections in the beverage is chosen to be large enough that one or more confections are usually in motion, yet not so large that the confections inhibit the swimming motions of each other. In a preferred embodiment the confections are soft and colorful, and the recognizable shapes of the confections are marine-related shapes.

41 Claims, 9 Drawing Sheets

420

430

CONFECTIONS THAT "SWIM" IN A CARBONATED BEVERAGE

CROSS-REFERENCE TO RELATED APPLICATIONS

This patent application is a continuation-in-part of U.S. regular patent application of the same title by Laurence J. Shaw, Ser. No. 09/087,042, filed May 29, 1998, now abandoned, which is a continuation-in-part of U.S. regular patent application of the same title by Laurence J. Shaw, Ser. No. 08/756,725, filed Nov. 26, 1998, now abandoned, which is a continuation-in-part of the U.S. provisional patent application of the same title by Laurence J. Shaw, Ser. No. 60/010,736, filed Jan. 29, 1996, which is a continuation-in-part of the U.S. provisional patent application of the same title by Laurence J. Shaw, Ser. No. 60/007,655, filed Nov. 28, 1995.

BACKGROUND

The present invention relates generally to toys and amusements, particularly to edible toys and amusements, more particularly to edible toys and amusements with kinetic properties, and even more particularly to edible toys and amusements with kinetic properties in carbonated beverages.

A well-known demonstration of varying buoyancy involves putting raisins (see Sink Or Swim!: The Science of Water, by Barbara Taylor, Random House Publishing, New York, 1990, page 22) or small clay balls (see Physics For Every Kid, by Janice Pratt VanCleave, John Wiley & Sons, Inc., New York, 1991, pages 64–65) in a carbonated beverage with no ice. (For convenience this discussion will address the motion of raisins, although it should be noted that the clay balls behave in the same manner.) The raisins initially sink, since their specific gravity is greater than unity. When the population of carbon dioxide bubbles which forms on the surface of a submerged raisin reaches a sufficient volume, the raisin is lifted to the surface of the beverage. Then, at the surface of the beverage those bubbles which come in contact with the beverage/air interface escape into the air, leaving the raisin/bubble ensemble with a density greater than that of the beverage and so the raisin again sinks, beginning another cycle of motion. (Henceforth in the present application the repeated ascents and descents of an object in a carbonated beverage due to the changing buoyancy of the object and attached carbonation bubbles will be referred to as "swimming.")

However, the specific gravity, size, shape and surface texture of raisins is difficult to control, and generally varies greatly. Some raisins will be too dense, or have too little surface area, and therefore will tend to remain at the bottom of the beverage. Other raisins will not be dense enough or will have too much surface area relative to the total volume of the population of bubbles attached to the surface, and will therefore tend to remain floating at the top of the beverage. Furthermore, even raisins which do rise and sink in the carbonated beverage due to the changing buoyancy of the raisin and the attached carbonation bubbles, will not have their volume, surface area and specific gravity optimized to minimize stasis times of the raisins at the top and bottom surfaces of the beverage. Furthermore, the surface texture of raisins is not optimal to promote bubble nucleation or retain large bubbles. Also, the number of raisins in the beverage will not be optimized so that a maximum number of raisins are in motion at any instant. In addition, the raisins do not have shapes which might stimulate the imaginations of young children.

Operating on a similar principle is a plastic toy which is shaped like a submarine and has an interior chamber for holding a charge of baking powder (such as the Undersea Explorer™ manufactured by DaMert Company of San Leandro, Calif.). The baking powder is loaded in the chamber by first submerging the submarine in a vessel of water to wet a screen at the bottom of the chamber, shaking the submarine to remove most of the water from the chamber while retaining some water in the screen, loading the baking powder into the chamber through a top port, and sealing the top port. When the submarine is then put in the water, it will descend since the plastic and baking powder has a specific gravity greater than that of water. However, when water enters the chamber via the screen at the bottom of the chamber, a chemical reaction between the water and the baking powder produces gases in the chamber which change the buoyancy of the submarine, inducing it to ascend. When the volume of the gasses becomes sufficiently large, the bubble formed against the screen at the bottom of the chamber dislodges from the submarine, and the submarine again descends to begin another cycle of motion.

One drawback of this type of toy is that does not always work properly because its operation is sensitive to how the baking powder is loaded in the chamber. If the baking powder is packed too densely, water will only reach the inner regions of the baking powder charge slowly, and the toy will only rise infrequently. If too little baking powder is put in the chamber, the toy will rise only a few times or not at all. If too much water remains in the chamber when the baking powder is put in, then the reaction will happen too quickly and the motion of the toy will only last for a short period of time. Or, if not enough water remains on the screen when the baking powder is loaded in the chamber, water will not pass through the screen to the baking powder charge and the chemical reaction will not take place to allow the toy to ascend. The amount of baking powder and the density of the packing of the baking powder becomes easier to control as the toy and its chamber becomes larger, and if the toy is made of injection molded plastic, the screen becomes easier to manufacture as the toy is made larger.

Therefore, a disadvantage of this type of toy is that a large vessel of water is required. For instance, the submarine-shaped toy manufactured by DaMert Company is approximately 11.5 cm long and 4.0 cm in height, and therefore a vessel larger than a drinking cup is clearly required. Another disadvantage of this type of toy is that generally only a single toy is played with because of the difficulties associated with properly loading the baking powder. Therefore, during the periods of stasis of the toy at the top and bottom of the vessel of water, there are no other components in motion to hold one's interest.

It is therefore an object of the present invention to provide an article with a density and shape such that it will repeatedly rise and sink, i.e., "swim," in a carbonated liquid.

It is another object of the present invention to provide an edible article which will swim in a carbonated beverage, particularly a carbonated beverage contained in a drinking cup or glass, and particularly an edible article that does not degrade the appearance of the carbonated beverage.

Furthermore, it is an object of the present invention to provide an article which will repeatedly rise and sink in a carbonated liquid with short stasis times at the top and bottom of the liquid.

It is another object of the present invention to provide a self-contained integrally-formed article which will repeatedly rise and sink in a carbonated liquid.

It is another object of the present invention to provide an article with a cross-section of arbitrary dimensions which ascends and descends in a carbonated liquid.

It is another object of the present invention to provide a group of articles which, when put in a carbonated liquid, a substantial percentage of the articles will generally be in motion at any instant.

It is another object of the present invention to provide a number of articles which ascend and descend in a carbonated liquid, such that articles do not interfere with the motions of other articles.

It is another object of the present invention to provide an article which ascends and descends in a carbonated liquid with a surface texture that promotes bubble nucleation.

It is another object of the present invention to provide an article which ascends and descends in a carbonated liquid with a surface texture that can retain large bubbles.

It is another object of the present invention to provide an article with the intriguing and exciting appearance of a recognizable object, preferably a recognizable kinetic object, which ascends and descends in a carbonated liquid.

It is another object of the present invention to provide an article that ascends and descends in a carbonated liquid due to changing buoyancy which will operate without trial-and-error experimentation.

It is another object of the present invention to provide an article which ascends and descends in a carbonated liquid due to changing buoyancy over a long time period.

It is another object of the present invention to provide an article which ascends and descends in a carbonated liquid with a cycle time which is relatively insensitive to small deviations in the dimensions, density or surface texture of the article, or the level of carbonation of the liquid.

Additional objects and advantages of the invention will be set forth in the description which follows, and will be obvious from the description or may be learned by practice of the invention. The objects and advantages of the invention may be realized and obtained by means of the instrumentalities and combinations particularly pointed out in the claims.

SUMMARY OF THE INVENTION

The present invention is directed to a confection with a specific gravity and dimensions such that, when put in a carbonated beverage, the carbonation bubbles which attach themselves to the confection cause it to ascend and descend, i.e., "swim." The present invention is also directed to a thin confection with a specific gravity and thickness such that, when put in a carbonated beverage, the carbonation bubbles which attach themselves to the confection cause it to swim. The present invention is also directed to a confection having the shape of a recognizable man-made or naturally-occuring object, and having a specific gravity and thickness such that, when put in a carbonated beverage, the carbonation bubbles which attach themselves to the confection cause it to swim. The present invention is also directed to a number of the aforementioned confections, the number being small enough that the confections do not inhibit the swimming motions of each other, and being large enough that at least one confection is usually in motion. The present invention is also directed to a confection which ascends and descends in a carbonated beverage, which has a surface texture that is rough on small length scales so as to promote bubble nucleation. The present invention is also directed to a confection which ascends and descends in a carbonated beverage, which has a surface texture that is smooth on intermediate length scales so as to retain large bubbles at arbitrary locations.

BRIEF DESCRIPTION OF THE FIGURES

The accompanying figures, which are incorporated in and form a part of this specification, illustrate embodiments of the invention and, together with the description given above and the detailed description of the preferred embodiments given below, serve to explain the principles of the invention.

FIG. 6B shows the impact area for rectangles of dimensions a×b with longitudinal axes separated by an angle θ.

DETAILED DESCRIPTION OF THE PREFERRED EMBODIMENTS AND UNDERLYING PHYSICAL PRINCIPLES

The preferred embodiment of the present invention provides a confection which (i) has a large number of cycles of ascension and descension per unit time;

(ii) has a recognizable man-made or naturally-occurring shape and a large enough cross section that the shape is easily discernible;

(iii) is soft so as not to present a choking danger or injure the throat if swallowed; and (iv) is made of ingredients which do not "muddy" the beverage.

Furthermore, a group of such confections is provided which (v) has a cardinality which is large enough that at least one confection is generally in motion at any instant, although the cardinality and the cross-sectional areas are not so large that the confections are likely to impede each other's motion.

The following are general physical characteristics that promote short stasis times of the confection at the top and bottom of the beverage:

(i) the specific gravity is somewhat greater than that of water;

(ii) the ratio of the surface area to volume is large;

(iii) the surface has a texture which promotes a large volume of bubbles per unit surface area by facilitating bubble nucleation and retaining large bubbles;

(iv) the number and size of the confections is chosen to avoid a tendency for confections to interfere with the swimming motions of other confections; and (v) the performance of the confections does not degrade with time as they dissolve in the beverage.

Mathematical relationships of the physical properties which promote short stasis times of the confection at the top and bottom of the carbonated beverage are provided in detail below. (It should be noted that although the present specification discusses a "carbonated beverage" and "confections," these are used as generic terms for, and the present invention is considered to be directed to, any liquid which is supersaturated with a gas and any articles which may be submerged in the liquid.)

Reference will now be made in detail to preferred embodiments of the confections of the present invention and the physical principles underlying the swimming of the confections in a carbonated beverage. While the invention will be described in conjunction with the preferred embodiments and the underlying physical principles, it should be understood that these descriptions are not intended to limit the invention to the described embodiments, or to depend on the accuracy of the description of the underlying physical principles, or the accuracy of the approximations made in the analysis of the physical principles. On the contrary, the invention is intended to cover alternatives, modifications and equivalents which may be included within the spirit and scope of the invention as defined by the appended claims.

Overview

Figure 1A:
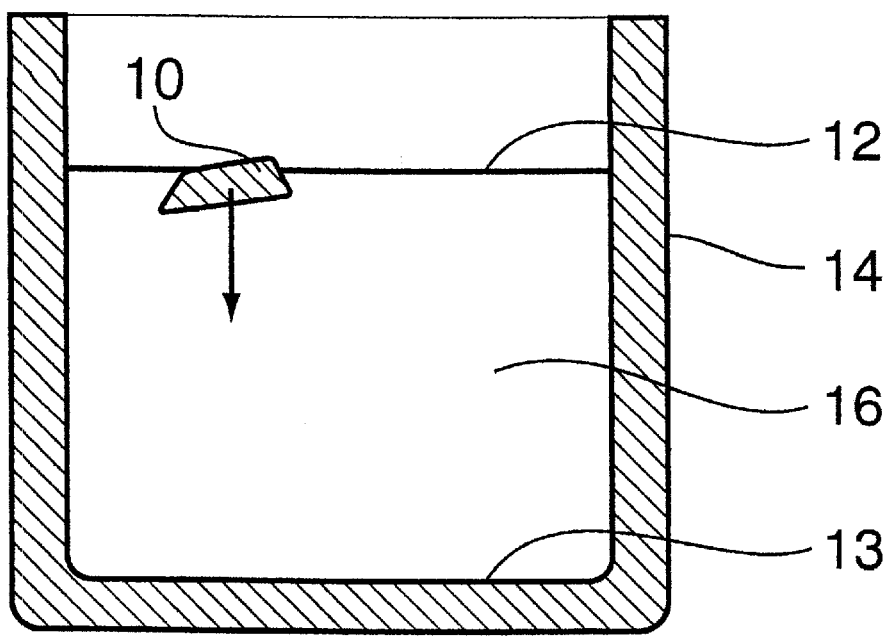
FIGS. 1A, 1B, 1C, 1D, 1E, 1F and 1G show a time sequence of side views of a confection of the present invention in a carbonated beverage.
Figure 1B:
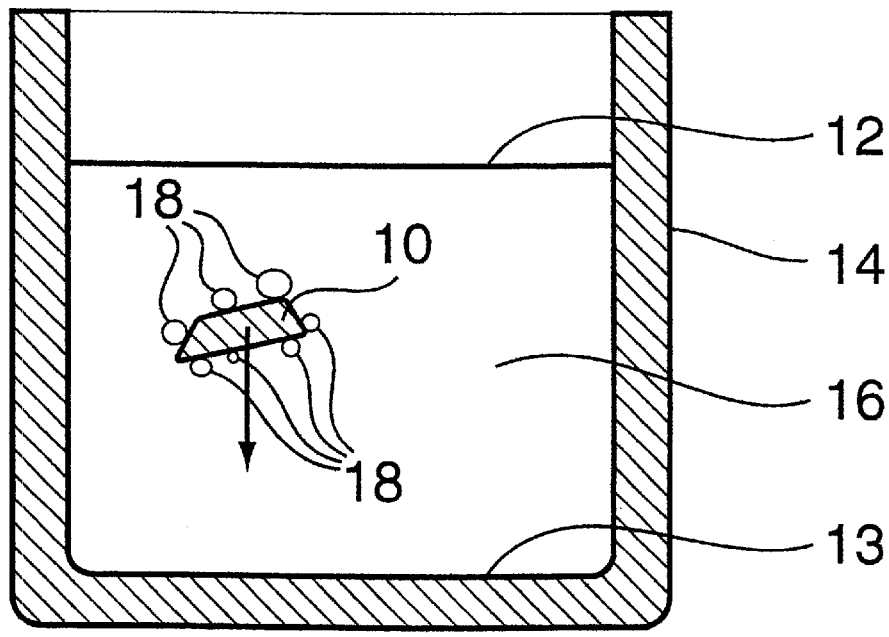
Figure 1C:
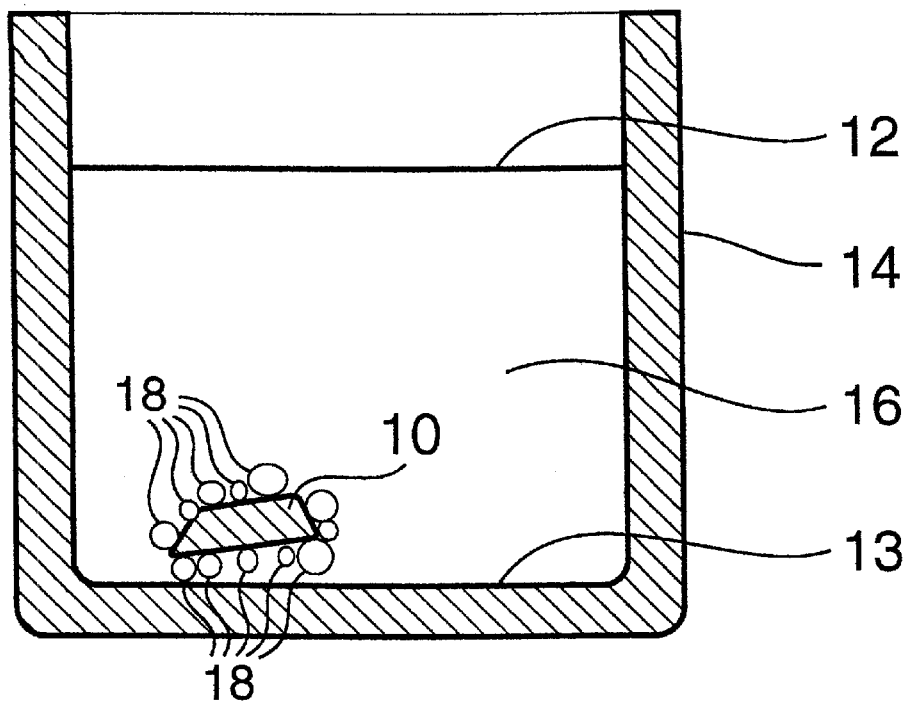
Figure 1D:
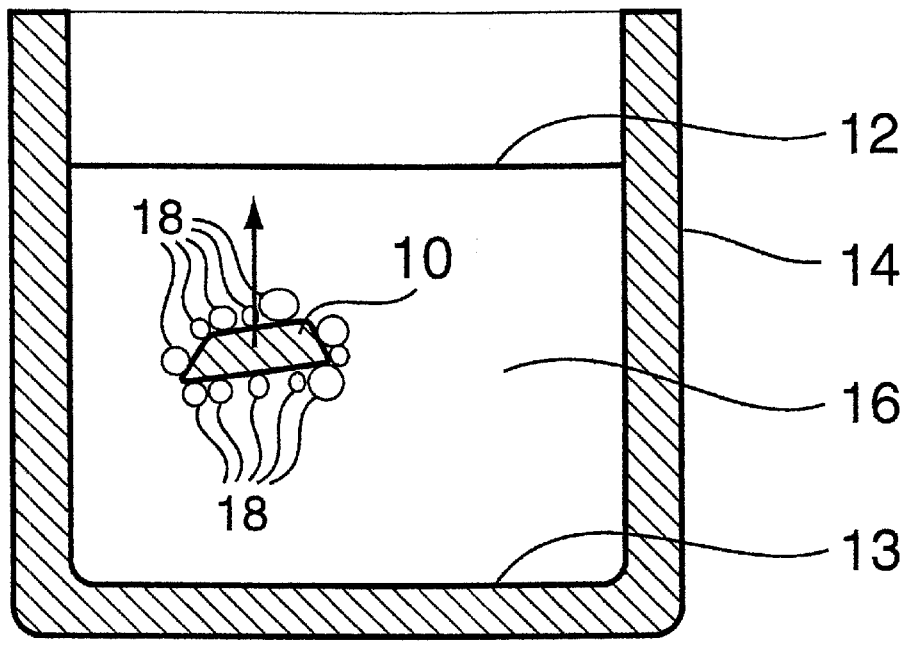
Figure 1E:
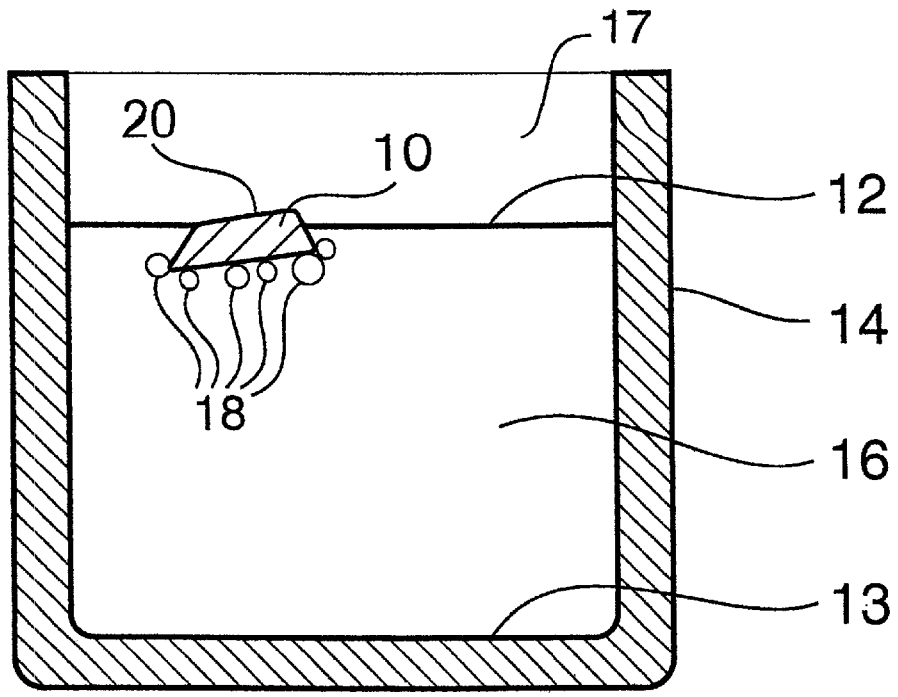

As shown schematically in FIG. 1A, when a confection (10) according to the present invention is initially put in a cup or glass (14) containing a carbonated beverage (16), the confection (10) will descend to the bottom (13) of the beverage (16) if it is more dense than the beverage (16). While descending, carbonation bubbles (18) form on the confection (10) as shown in FIG. 1B. (Although carbonation bubbles also form on the walls of the cup (14), such bubbles are not shown in FIGS. 1A–1G for clarity.) As the confection/bubbles ensemble (10, 18) rests at the bottom of the beverage (16), bubbles (18) continue to form on the surface of the confection (10) and grow in size, as shown in FIG. 1C, until the overall density of the confection/bubbles ensemble (10, 18) is less than that of the beverage (16) and the confection/bubbles ensemble (10, 18) rises through the beverage (16), as shown in FIG. 1D. When the confection/bubbles ensemble (10, 18) reaches the top (12) of the beverage (16), the bubbles which had been on the top surface (20) of the confection (10) escape into the atmosphere (17), as shown in FIG. 1E.

Figure 1F:
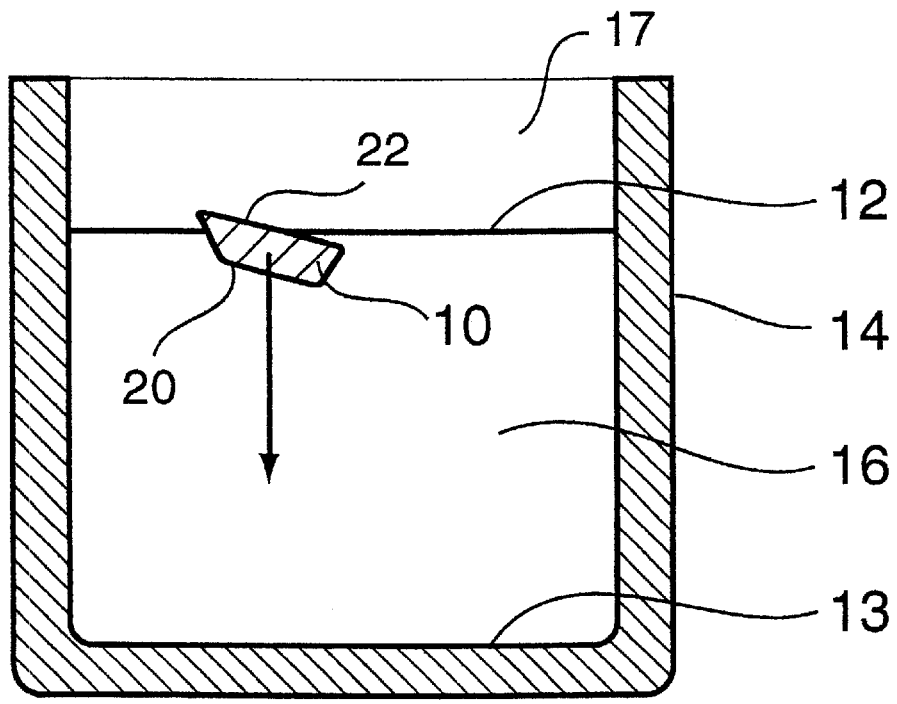

If the confection (10) is not too flat, at this point the confection (10) will rotate so that what had previously been a lower surface (22) also comes into contact with the top (12) of the beverage (16). The bubbles on this surface (22) also escape into the atmosphere (17), as shown in FIG. 1F, and the confection (10) will again descend.

Figure 1G:
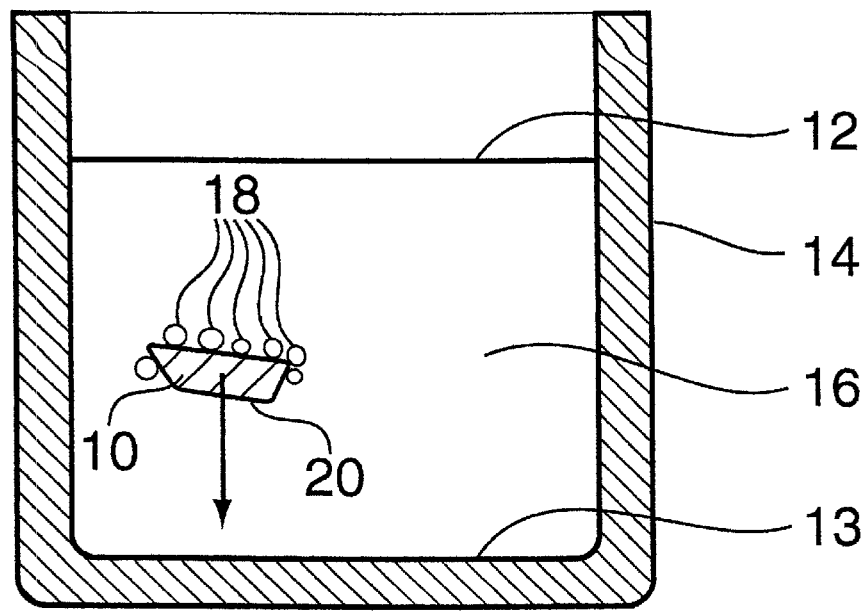

However, if the confection (10) is sufficiently flat it will not rotate until it begins descending from the top surface (12) of the beverage (16), at which point the confection (10) will rotate so the surface which had previously been the bottom surface (22) becomes the top surface, as shown in FIG. 1G. The confection/bubble ensemble (10, 18) descends to the bottom (13) of the beverage (16), and remains there until the bubbles (18) on confection (10) again grow to sizes sufficient to cause the confection/bubble ensemble (10, 18) to rise through the beverage (16).

Of course, the bubbles (18) on the confection (10) do not simply grow continuously in size. When two adjacent bubbles on a surface grow to a size such that they touch with sufficient force, they coalesce to form one bubble with a volume equal to the sum of the volumes of the two original bubbles. Generally, the new bubble is located near the position of the larger of the two original bubbles. Furthermore, when a bubble on a surface with a normal vector at an angle $\Omega$ from vertical grows to have a radius greater than a maximum radius $R(\Omega)$, or when two bubbles coalesce to form a single bubble with a radius greater than the maximum radius $R(\Omega)$, the buoyancy force exerted by the surrounding fluid is greater than the force with which the bubble is attached to the surface, and the bubble detaches from the surface and rises through the beverage. The maximum radius $R(\Omega)$ depends on the texture of the surface, and the surface tensions between the confection and carbon dioxide, the confection and the beverage, and the carbon dioxide and the beverage. As the normal vector of the surface tilts away from vertical, the value of R typically decreases until $\Omega=90°$, at which point $R(\Omega)$ increases with $\Omega$.

The maximum bubble radius $R(\Omega)$ as a function of angle $\Omega$ can be determined visually, preferably with the assistance of optical and photographic instruments. Alternatively, the maximum bubble radius $R(\Omega)$ can be determined by measurements of the speed of ascension of the bubbles through the beverage. Experimental graphs of the ascension speed versus bubble size are presented in FIG. 5 of "On the rise of small air bubbles in water," P. G. Saffman, Journal of Fluid Mechanics, Volume 1, page 249, 1956. Typically, $R \equiv R(0) = 1.3 \pm 0.2$ mm.

The total buoyancy provided by the population of bubbles at time t is dependent on the volume of bubbles per unit surface area, i.e., the bubble coverage h(t). The bubble coverage h(t) is given by $$h(t) = \int_0^R (4/3)\pi r^3 f(r,t) dr, \quad (1.1)$$

where f(r,t) dr is the size distribution of bubbles per unit area. To obtain a rough idea of the relationship between h and R, for a high density of bubbles it may be noted that if the bubbles all have radius R and are arranged in a hexagonal close-packing formation, the volume per unit area is equal to $(2 \sqrt{3} \pi R/9) \approx 1.2$ R.

Figure 2A:
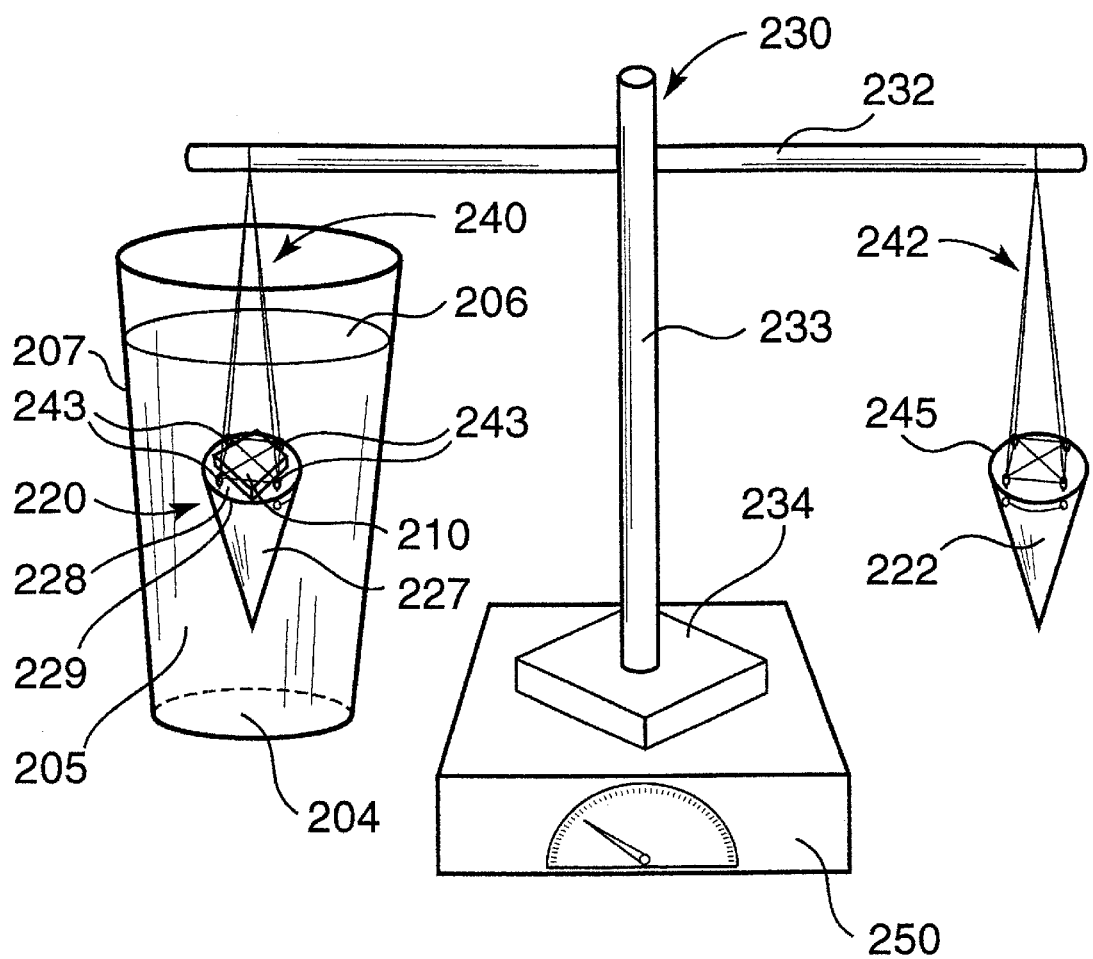
FIGS. 2A and 2B show an apparatus for measuring the volume per unit area of carbonation bubbles on the top and bottom surfaces of a confection, respectively.

The buoyancy as a function of time for the top surface of a particular confection in a particular carbonated beverage may be measured directly using the system shown in FIG. 2A. As shown in FIG. 2A, the confection (210) is attached to a first platform (220) which is suspended from a crane structure (230), and the first platform (220) and confection (210) are submerged in a carbonated beverage (205) contained in a cup or glass (207). So that the crane structure (230) has a low weight, it (230) is constructed of a lightweight material such as balsa wood, and has a cross-arm (232) with a second platform (222), with a mass approximately equal to that of the first platform (220), attached to the cross-arm (232) such that the first and second platforms (220) and (222) are approximately equidistant from the vertical support (233). Therefore, the base (234) of the crane (230) does not need to have a large weight to keep the crane (230) upright.

The crane (230) rests on a scale (250) which is capable of measuring weight to an accuracy of at least 0.01 grams, such as the Acculab V-Series J39,719 available through Edmund Scientific Company of Barrington, N.J. To prevent bubbles from forming on the bottom surfaces (227) of the platform (220), all bottom surfaces (227) have an orientation of at least 45° from horizontal and are coated with a nonsoluble lubricant such as WD-40® (manufactured by the WD-40 Company of San Diego, Calif.), 3-in-One® Household Oil (manufactured by Reckitt and Colman, Inc., of Wayne, N.J.) or Pure Silicon Lubricant (manufactured by Ace Hardware Corporation of Oak Brook, Ill.). In the preferred embodiment, the platform is made of polished aluminum and has a conical shape, with the upper surface (228) of the platform (220) having a surface area of at least 1 cm$^2$, and more preferably at least 2 cm$^2$. The platform (220) is suspended from the cross-arm (232) by a single loop of thread (240) passing through four equally-spaced bores (243) located near the edge (229) between the top surface (228) and the bottom surface (227). The upper ends of the bores (243) are located at the corners of a square, and the confection (210) is strapped to the platform (220) by placing it (210) between the thread (240) and the top surface of the platform (220). Preferably the entire top surface of the platform (220) is covered by the confection (210). Any exposed top surface (228) of the platform (220) must also be coated with the nonsoluble lubricant to prevent spurious contributions to the buoyancy.

Figure 2B:
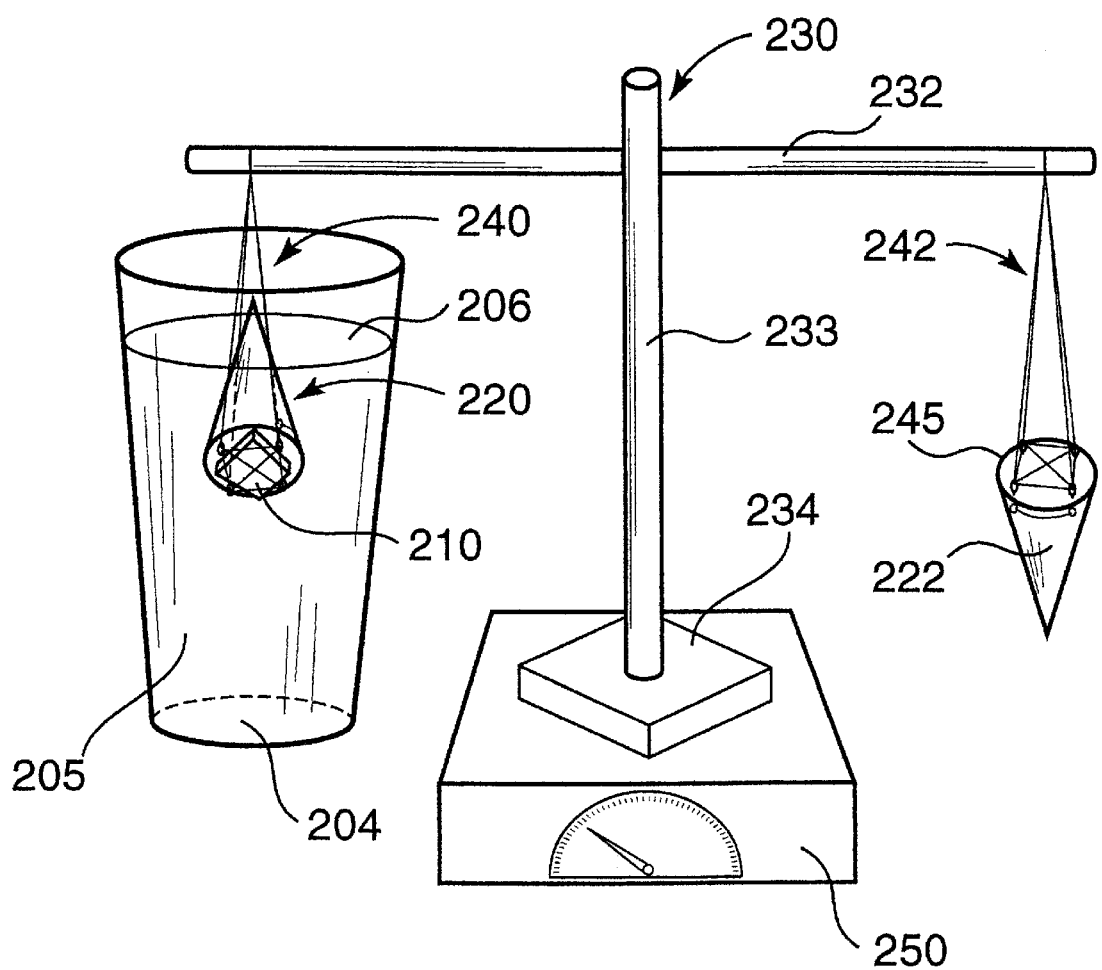

The buoyancy as a function of time for the bottom surface of a particular confection in a particular carbonated beverage may also be measured directly. As shown in FIG. 2B, in this case the platform (220) submerged in the beverage and the attached confection (210) are inverted relative to the arrangement of FIG. 2A, so that the exposed face of the confection (210) is facing downwards.

Alternatively, the buoyancy on a surface of a given orientation may be determined by photographing the population of bubbles on the surface, and counting the number of bubbles within each size interval to form a histogram approximating the size distribution function f(r,t) dr, and calculating the bubble coverage using equation (1.1). Because a view of the bubble population at the surface of the confection may be partially obscured by bubbles rising through the beverage and bubbles which are at rest at the upper surface of the beverage, a plurality of views from different angles may be used to obtain a complete view at any instant. The combination of views is facilitated by using cameras with a small depth of field focused at the surface of the confection, thereby making it apparent which bubbles are not located at the surface of the confection. Those bubbles which are on the surface (and therefore in focus) in a first image are labeled with reference numerals, and their sizes are tabulated. Some bubbles on the surface may be partially obscured by bubbles which have risen from the surface of the confection (and are therefore out of focus), and, if possible, these partially obscured bubbles are also labeled and their sizes are measured. Then a second image taken from a different angle is inspected and those bubbles on the surface which are also visible in the first image are labeled with the reference numerals with which they were labeled in the first image. If bubbles which were partially obscured in the first image are less obscured in the second image, then the sizes determined by inspection of the second image are used in the tabulation. Then, the sizes of bubbles which are visible in the second image but not the first are tabulated. Finally, the fraction of the area which is not obscured is calculated, and f(r,t) is scaled by the inverse of this fraction when calculating the bubble coverage h(t) according to equation (1.1).

Physical Requirements for Ascents

When the weight of a submerged confection and the attached bubbles becomes less than the weight of the displaced beverage, the confection will rise. Therefore, the confection rises when $$\beta\, V + \beta g\, A\, h(t) < \beta l\, [V + A\, h(t)] \tag{2.1}$$

where V, A, and $\beta$ are the volume, surface area and specific gravity of the confection, $\beta l$ and $\beta g$ are the specific gravity of the carbonated beverage and the carbonation bubbles, and h(t) is the volume per unit surface area of the population of bubbles on a surface of the confection as a function of time t since that surface has been exposed to the atmosphere. The function h(t) is termed the "bubble coverage." (It should be noted that surface textures on length scales less than the maximum bubble radius R are considered to influence the bubble coverage h(t), rather than contribute to the surface area A—see the section entitled "The Surface Texture.")

Since $\beta l$ and $\beta$ are much greater than $\beta g$, the second term on the right in equation (2.1) can be ignored. Incorporating the approximation $\beta l \approx 1$, the confection rises when $$(\beta-1)\, V/A\, h(\infty) < h(t)/h(\infty) \tag{2.2}$$

where h($\infty$) is the limit of h(t) as t->$\infty$, i.e., the steady-state value of h(t). Typically, h(t) is roughly equal to h($\infty$) when the time t is several multiples of the time it takes a lone bubble (i.e., a bubble having no other bubbles in the vicinity with which to coalesce) to grow to the maximum radius R. (It is to be understood that in this limit the time t must still be considerably smaller than the time it takes for the beverage to lose its carbonation.) The bubble coverage h(t) is a monotonically increasing function of time, so if $$(\beta-1)\, V/A\, h(\infty) < 1, \tag{2.3}$$

then the bubbles on the surface of the confection are able to grow to a size large enough that the confection will rise.

A measure of the ability of a confection to ascend is therefore the dimensionless overall effectiveness ratio $E_T$, given by $$(\beta-1)\, V/A\, h(\infty). \tag{2.4}$$

A confection with a small value of the overall effectiveness ratio $E_T$ only requires a value of h(t) which is small compared to h($\infty$) to rise to the surface, so such confections spend little time submerged before rising.

Another effectiveness measure is the dimensionless geometric effectiveness ratio $E_G$ given by $$V/A\, h(\infty). \tag{2.5}$$

The smaller the value of the geometric effectiveness ratio $E_G$, the farther the specific gravity $\beta$ can vary from unity while still providing a small value of the overall effectiveness ratio $E_T$. In the preferred embodiment the geometric effectiveness ratio $E_G$ is less than $\frac{1}{2}$, more preferably less than $\frac{1}{3}$, more preferably less than $\frac{1}{4}$, even more preferably less than $\frac{1}{5}$, even more preferably less than $\frac{1}{6}$, still more preferably less than $\frac{1}{8}$, still more preferably less than $\frac{1}{10}$, and still more preferably less than $\frac{1}{13}$.

A confection of widths $W_1$ and $W_2$ and thickness T is considered to be "thin" when the total surface area is considerably larger than the surface area of the side surfaces. Mathematically, a confection is considered to be thin when $$T < H\, (W_1 \times W_2)/(W_1 + W_2), \tag{2.6}$$

where H is positive with a value less than unity. In the preferred embodiment the confection is thin, and H is preferably less than $\frac{1}{2}$, more preferably less than $\frac{1}{3}$, more preferably less than $\frac{1}{4}$, more preferably less than $\frac{1}{5}$, more preferably less than $\frac{1}{6}$, even more preferably less than $\frac{1}{7}$, even more preferably less than $\frac{1}{8}$, even more preferably less than $\frac{1}{9}$, even more preferably less than $\frac{1}{10}$, still more preferably less than $\frac{1}{12}$. still more preferably less than $\frac{1}{15}$, still more preferably less than $\frac{1}{20}$, even still more preferably less than $\frac{1}{25}$, and still more preferably less than $\frac{1}{30}$.

A view of a thin confection such that an area approximately equal to $W_1 \times W_2$ is visible is considered the plan view, and this area is termed the "plan-view" area. For thin confections the volume is approximately equal to the thickness times half the surface area (i.e., $V \approx T(A/2)$), so $$E_T \approx T/2 \; h(\infty)$$

and $$E_G \approx (\beta-1) \; T/2 \; h(\infty), \quad (2.7)$$

and ascension condition is $$(\beta-1) \; T/2 \; h(\infty) < 1. \quad (2.8)$$

Therefore, the maximum thickness $T_{max}$ for which ascension can occur for a given specific gravity $\beta$ and steady-state bubble coverage $h(\infty)$ is given by $$T_{max} = 2 \; h(\infty)/(\beta-1). \quad (2.9)$$

Thin confections provide the advantages that the overall and geometric effectiveness ratios $E_T$ and $E_G$ are now only functions of one dimension of the confection, the thickness T. This allows the effectiveness ratios to be easily controlled, the dimensions of the confection other than the thickness T to be made arbitrarily large, and the cross-section of the confection to have an arbitrary shape.

Under real-world manufacturing conditions the thickness T, specific gravity $\beta$, and steady-state bubble coverage $h(\infty)$ of confections will have finite accuracies (i.e., standard deviations) of $\Delta T$, $\Delta \beta$, and $\Delta h(\infty)$, respectively. To insure that most confections are able to ascend, the ascension condition (2.8) becomes $$(\beta-1) \; T/2 \; h(\infty) \times \{1+[[\Delta T/T]^2+[\Delta h(\infty)/h(\infty)]^2+[\Delta \beta/(\beta-1)]^2]^{1/2}\} < 1, \quad (2.10)$$

where T, $\beta$, and $h(\infty)$ are the target or mean values of the thickness, specific gravity and steady-state bubble coverage, respectively, and the statistical independence of the accuracies $\Delta T$, $\Delta \beta$, and $\Delta h(\infty)$ is assumed. The expression $$[[\Delta T/T]^2+[\Delta h(\infty)/h(\infty)]^2+[\Delta \beta/(\beta-1)]^2]^{1/2}, \quad (2.11)$$

is termed the overall relative accuracy, $\Delta \Pi$. Preferably, the overall relative accuracy $\Delta \Pi$ is less than 35%, more preferably less than 30%, more preferably less than 25%, still more preferably less than 20%, still more preferably less than 15%, even more preferably less than 10%, still more preferably less than 5%, and more preferably yet, less than 2.5%.

Although the above calculations should take into account the difference in values for the steady-state bubble coverage on upward-facing surfaces $h_{top}(\infty)$ and downward-facing surfaces $h_{bot}(\infty)$, to first approximation this difference can be ignored and the value of $h_{top}(\infty)$ can be used for $h(\infty)$ in the above equations. Although the value of $h_{bot}(\infty)$ can be larger than $h_{top}(\infty)$, if $h_{bot}$ is substantially greater than $h_{top}$ when the confection begins to rise through the beverage, the greater buoyancy generated by the bubbles on the lower surface will cause the confection to rotate so that what had previously been the lower surface become the upper surface. Then, a substantial portion of the bubbles on what becomes the upper surfaces will separate from the confection so that the buoyancy contributed by this surface will be less than or equal to $h_{top}(\infty)$.

Physical Requirements for Descents

If a confection has a specific gravity $\beta$ greater than unity (the approximate specific gravity of the carbonated beverage), the confection will initially sink when put in the beverage. If the specific gravity and dimensions of the confection are within the bounds discussed in the previous section, the confection will then rise to the surface of the beverage and those bubbles which contact the surface of the beverage will escape into the air.

Depending on the geometry of the confection, the confection may or may not rotate when the bubbles on the upper surface of the confection contact the beverage/air interface and escape into the air. A confection is considered to be "round" if it rotates as the bubbles on the top surface escape into the air, thereby allowing the bubbles on the bottom surface to also escape. Therefore, a round confection will descend if $$\beta > 1. \quad (3.1)$$

Figure 7:
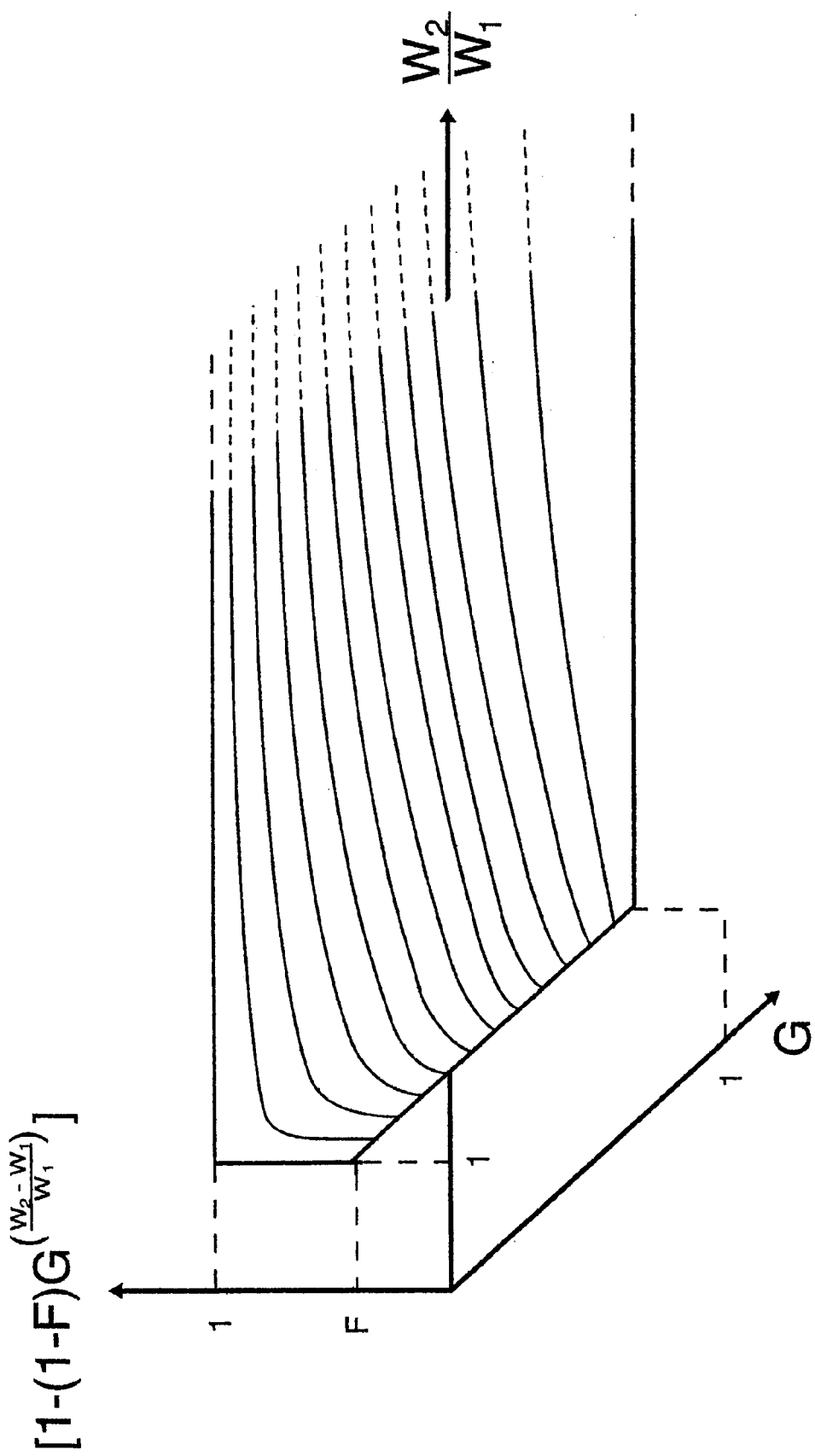
FIG. 7 shows a graph of a function used in the determination of preferred range of values for the thickness of a confection as a function of the other dimensions of the confection.

A confection which is not round, is considered to be "flat." Generally, a confection is flat if the thickness T is bounded by $$T < W_1[1-(1-F) \; G^{(W_2-W_1/W_1)}], \quad (3.2)$$

where $W_1 < W_2$ and F and G are less than unity. FIG. 7 provides a graph of the factor in square brackets in equation (2.6) as a function of G and $(W_2/W_1)$. When $W_2/W_1=1$ the factor is equal to F regardless of the value of G, and as $W_2/W_1$ becomes large the factor in square brackets approaches a value of unity. Preferably the confection of the present invention is flat and $0 \leq F \leq L_1$, and $L_2 \leq G \leq 1$, where $L_1$ is preferably ½, more preferably ⅓, still more preferably ¼, still more preferably ⅕, still more preferably ⅙, still more preferably ⅐, even still more preferably ⅛, even still more preferably ⅑, and even more preferably ⅒, and where $L_2$ is preferably ½, more preferably ⅔, still more preferably ¾, still more preferably ⅘, still more preferably ⅚, still more preferably ⁶⁄₇, even still more preferably ⅞, even still more preferably ⅞, and even more preferably ⁹⁄₁₀.

It should be noted that a confection which does not rotate at the top surface of a carbonated beverage when the carbonation bubbles escape from the top surface of the confection into the atmosphere, is not necessarily thin (according to the definition of equation (2.6)). For instance, a rectangular parallelepiped may not rotate as the bubbles on a $W_1 \times W_2$ surface escape into the air, and yet the thickness T may not satisfy equation (2.6) with a preferred value of H. Or, a confection having an L-bracket shape may not rotate as bubbles leave a surface (such as the outside vertical portion of the "L") in contact with the air, yet the nonplanarity of the confection would not allow it to qualify as thin. However, confections which are thin are generally also flat.

For flat confections there are two mechanisms for descension. If a flat confection is sufficiently heavy, then the confection will descend when the bubbles leave the top of the confection but remain on the bottom. In this case, the descension condition is $$T > h_{bot} \; (t_C)/(\beta-1), \quad (3.3)$$

$$(\beta-1)T/h_{bot} \; (t_C) > 1, \quad (3.4)$$

where $t_C$ is the time for one cycle of motion, i.e., the time for the confection to descend and ascend. The value of the bubble coverage for a downward-facing surface, $h_{bot}$, is used since the surface which faces downward when the confection descends has been facing downward nearly the entire cycle time, because when the confection first descends from the beverage interface the buoyancy of the population of bubbles on the downward-facing surface causes the confection to rotate so that this bubble population is on the upward-facing surface.

If the confection is flat and condition (3.3) is not satisfied (while condition (3.1) is satisfied), then the bubbles must also leave the bottom surface of the confection before the confection can descend. In this case, the confection remains at the top of the beverage long enough for the bubbles on the bottom of the confection to coalesce to form large, somewhat flat bubbles. When these bubbles become sufficiently large to roll off the bottom of the confection, the confection can descend. This mechanism for descension of the confection requires more time than the mechanism described in connection with condition (3.3), so the number of descents per minute per confection is greater when condition (3.3) is satisfied.

Experimental Results: Activity as a Function of Thickness

The "activity," i.e., the number of descents per minute per confection, for a given confection is a function of the dimensions, surface texture and material composition of the confection, as well as the level of carbonation and hydrodynamic properties of the beverage. (It should be noted that the activity is equal to the inverse of the cycle time $t_C$.) The activity for a thin confection may be estimated by calculation or computer simulation, or measured emperically as described in this section.

Figure 4:
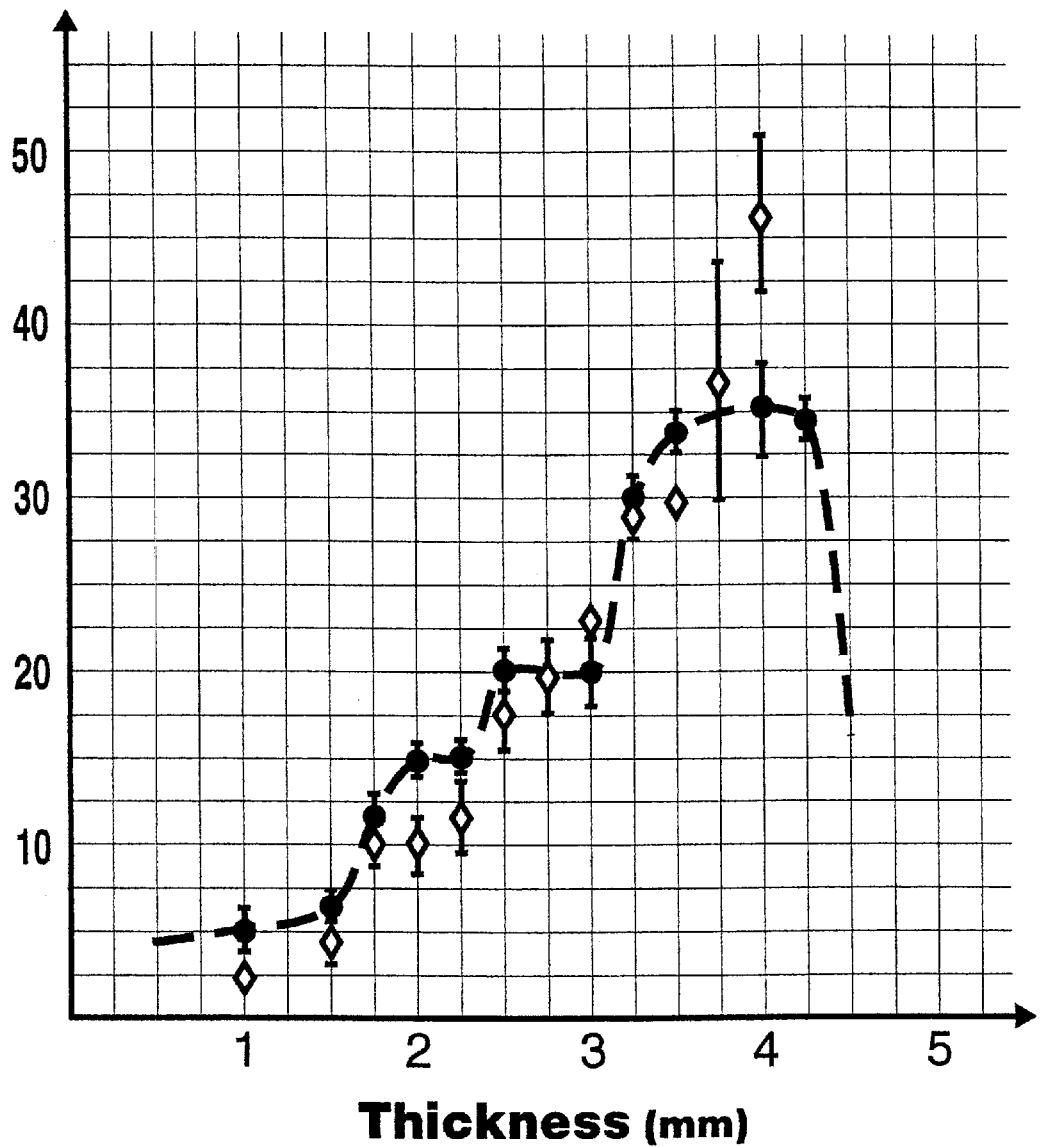
FIG. 4 plots descents per minute per confection versus thickness for confections in a carbonated beverage.
Figure 3:
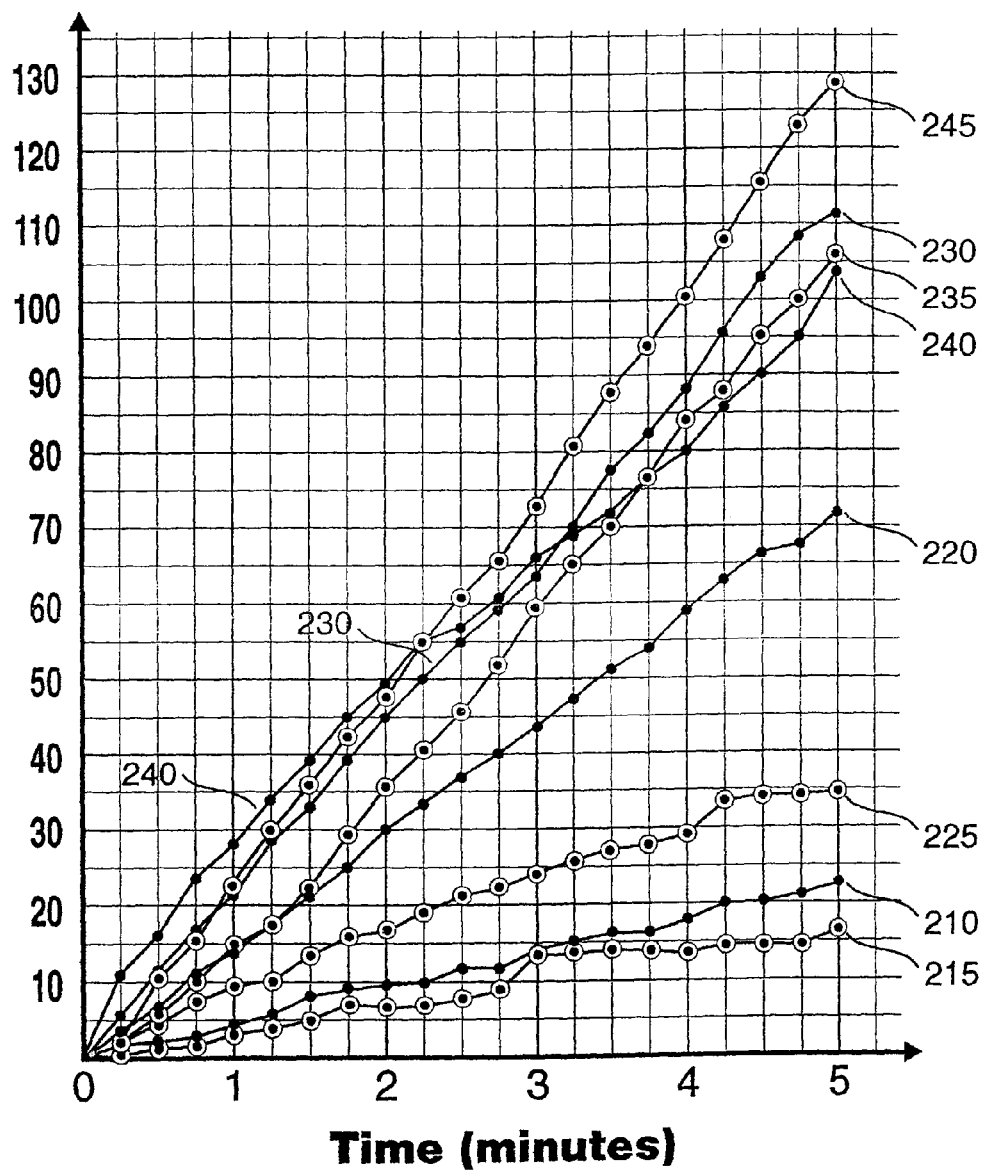
FIG. 3 plots the total number of descents versus time for confections with thicknesses of 1.0 mm, 2.0 mm, 3.0 mm and 4.0 in 7-UP® carbonated beverage at room temperature and 0° C.

Nonsoluble articles are used to accumulate data for the graphs of FIGS. 3 and 4, although low- or intermediate-solubility articles having the same overall effectiveness ratio $E_T$ and geometric effectiveness ratio $E_G$ exhibit a similar behavior. It should be noted that the solubility of confections varies greatly: oil-based confections, such as chocolate have a very low solubility; gelatin-based confections, such as Trolli Gummi Bears (distributed by GPA Incorporated of St. Louis, Mo.), are of intermediate solubility; and confections composed predominantly of sugar or corn syrup have a high solubility.

The advantage of using nonsoluble articles to gather data is that the same set of articles can be used in multiple experiments, and the dynamics are not affected by changes in the dimensions and the surface characteristics with time. In particular, the articles used were white Mars Plastic erasers, serial no. 526 50, manufactured by Staedtler Company of Nuremberg, Germany. The erasers have a cross-sectional area of 2.2 cm×1.1 cm, and a specific gravity of approximately 1.54. For consistency of nomenclature the erasers are sometimes referred to as "confections" in this section of the present specification.

Each data run is begun by opening a fresh can or bottle of room-temperature soda, and pouring the entire can or bottle into a cup with a diameter between 7.5 cm and 8.0 cm. Because the eraser material, unlike a water soluble confection, is not "wetted" by water, a small amount of dish soap (such as Dawn®, manufactured by Procter and Gamble of Cincinnati, Ohio) is added to the top surface of the beverage to insure that the surface tension does not affect the dynamics. The dish soap is added by putting a small amount on the tip of the experimenter's finger, and rubbing the finger and thumb together in the beverage to temporarily produce a thin foam over the entire top surface of the beverage. Immediately after the dish soap is added, and within 30 seconds of opening the beverage, eight confections are dropped in the beverage and the descents are counted over the next five minutes. A descent is counted for each instance that a confection at the top of the beverage descends more than halfway down through the beverage.

FIG. 3 shows plots of the total number of descents versus time in minutes for eight confections of various thicknesses in 7-UP® carbonated beverage (12 fluid ounce can, manufactured by the Seven-Up Company of Dallas, Tex.) at room temperature and 0° C. In particular, plots 210, 220, 230 and 240 are for confections of thicknesses 1.0 mm, 2.0 mm, 3.0 mm and 4.0 mm in room temperature 7-Up® carbonated beverage, and plots 215, 225, 235 and 245 are for confections of thicknesses 1.0 mm, 2.0 mm, 3.0 mm and 4.0 mm in 7-Up® carbonated beverage at 0° C. The thicknesses of the confections are accurate to ±0.08 mm. The plots 210, 215, 220, 225, 230, 235, 240 and 245 are approximately straight indicating that the activity is approximately constant for at least the first five minutes. (The temperature and thickness dependences are discussed below.)

FIG. 4 is a plot of the activity versus thickness for eight confections in room temperature 7-Up® carbonated beverage. Again, the thicknesses of the confections are accurate to ±0.08 mm. As can be seen from FIG. 4, the activity is monotonically increasing with thickness until the confections reach a thickness of approximately 4 mm. There is apparently a first activity plateau for thicknesses between approximately 2.0 and 2.25 mm, a second activity plateau for thicknesses between 2.5 and 3.0 mm, and a third activity plateau for thicknesses between 3.5 and 4.25 mm. At thicknesses greater than 30 or equal to $T_{max}=4.5$ mm the confections are too heavy to ascend.

Solving for $h(\infty)$ in equation (2.9) with $\beta=1.54$ and $T_{max}=4.5$ mm shows that $h(\infty)$ has a value of approximately 1.2 mm. If the time for one cycle of motion $t_C$ is large enough that $h_{bot}(t_C)$ is roughly equal to $h(\infty)$, the condition of equation (3.2) is satisfied for T>2.25 mm.

As confirmed by observation, for thicknesses up to and including the first plateau, bubbles must leave both sides of a confection for it to descend. As shown by a comparison of plots 210 and 215 and plots 220 and 225 of FIG. 3, for 1.0 mm and 2.0 mm confections the activity is greater for the room temperature beverage. This is due to the faster rate of bubble growth at room temperature which allows the bubbles on the bottom of a confection to grow more quickly to a size where they can roll off the bottom of the confection so it can descend.

For thickness corresponding to the second and third plateaus, the bubbles need only leave the top surface of the confection for it to descend. Furthermore, for the larger thicknesses in the third plateau only a small portion of the bubbles on the top of the confection need leave the confection for it to descend. As illustrated by a comparison of plots 240 and 245 of FIG. 3, for the larger thicknesses in the third plateau a slower rate of bubble growth resulting from a lower temperature beverage produces a greater activity. This is because a confection will only descend a short distance after losing one or more bubbles if the other bubbles on the confection have grow rapidly enough to keep the confection buoyant. The activity of confections with a thickness of 3.0 mm is relatively invariant with the temperature of the beverage, as shown by a comparison of plots 230 and 235, indicating that this thickness lies in the cross-over region between the two types of behaviours discussed above.

Confections must have thicknesses less than $T_{max}$ if they are to ascend in the carbonated beverage. As can be seen from FIG. 4, confections with thicknesses corresponding to the first, second and third plateaus, i.e., thicknesses which are 45% to 100% of $T_{max}$, are preferred since they generate a greater activity. Furthermore, confections with thicknesses corresponding to the second and third plateaus, i.e., thicknesses which are 55% to 100% of $T_{max}$, are more preferable since they generate a still greater activity. Furthermore, thicknesses which correspond to the third plateau, i.e., thicknesses which are 70% to 100% of $T_{max}$, are still more preferable since they generate an even greater activity. Even more preferable are thicknesses which are 75% to 95% of $T_{max}$, since this range corresponds more closely to the peak of the third plateau. More preferable still are thicknesses which are approximately 80% to 90% of $T_{max}$, since this range corresponds even more closely to the peak of the third plateau. Most preferable are thicknesses which are approximately 85% of $T_{max}$, since this corresponds to the center of the third plateau, so the activity should be relatively insensitive to any small deviations in the thickness, density, or surface texture of the confections. Furthermore, for thickness ranges predominantly near $T_{max}$ (such as the 75% to 95% of $T_{max}$ range, the 80% to 90% of $T_{max}$ range, or any relatively narrow range centered about approximately 85% of $T_{max}$) it is preferable to use a carbonated beverage which is chilled, i.e., cooled to a temperature below room temperature, since this results in an increase in the activity for some thicknesses, as discussed above in connection with FIG. 3.

Application of equation (2.10) indicates that when the overall relative standard deviation $\Delta\Pi$ is less than approximately 18%, the target thickness T can be set equal to the most preferable thickness of $0.85*T_{max}$, with little likelihood of a confection not satisfying equation (2.9) and therefore not being unable to ascend. However, when the overall relative standard deviation $\Delta\Pi$ is greater than approximately 18%, the target thickness T should be set at $T_{max}/(1+\Delta\Pi)$ to insure that there is little likelihood of confections being unable to ascend while still covering the preferred thickness ranges.

The Surface Texture

A liquid may be carbonated by subjecting it to a high-pressure atmosphere with a large partial pressure P of carbon dioxide. The partial pressure P of carbon dioxide in a liquid can be determined using Henry's law, which states that at a given temperature the partial pressure P is related to the amount X of dissolved carbon dioxide by a proportionality constant K, i.e., $$P = K X, \qquad (4.1)$$

The proportionality constants for water for temperatures of 0° C. and 25° C. are $2.98\times10^{-4}$ atm*liter/mg and $6.69\times10^{-4}$ atm*liter/mg, respectively (see *Surface Chemistry of Froth Flotation*, by Jan Leja, Plenum Press, New York, 1982). The difference of roughly a factor of two between the values of the proportionality constant at freezing and room temperature suggests that bubble growth should be about twice as fast at room temperature.

The amount of dissolved carbon dioxide in a carbonated beverage can therefore be estimated by measuring the difference between the weight of the beverage when it is fresh out of the bottle or can, and after it has lost its carbonation. To measure this weight difference the release of the carbon dioxide may be hastened by adding table salt to the beverage. Table salt has a high solubility in water and a molality of only 30 parts per thousand of salt reduces the solubility of carbon dioxide by approximately 10%, so if enough salt is added nearly all the dissolved carbon dioxide is released.

Table I below provides a comparison of the amount X of dissolved carbon dioxide (and the corresponding partial pressure P) for a number of commercially available carbonated beverages, where X is the ratio of the mass of the dissolved carbon dioxide to the mass of the beverage sans dissolved carbon dioxide. The beverage is subjected to a minimum of agitation during pouring, by tilting the cup so the beverage flows down the side of the cup to reach the bottom, so as to minimize the amount of carbonation lost during the transfer from the can to the cup. Measured carbonation levels are typically reduced by 20–40% by less careful pouring. The values of X in Table I were determined at room temperature by: measuring off approximately 40 grams of table salt; pouring approximately 80 milliliters of a freshly opened carbonated beverage gently into a cup; weighing the amount of the beverage in the cup; adding the table salt to the beverage; and determining the subsequent weight of the beverage, i.e., the weight of the beverage/salt solution minus the weight of the salt. (When 40 grams of salt is added to 80 milliliters of beverage, a portion of the salt remains undissolved since the saturation level is approximately 35 grams of salt per 100 milliliters of water at room temperature.) The salt is added slowly so that the foam which is produced does not rise to near the top of the cup, thereby avoiding losses of the beverage due to "splashing" as the bubbles in the foam pop.

TABLE I

| Beverage | (Mass $CO_2$/Mass beverage) × $10^3$ | P (atm) |
|---|---|---|
| 7-UP* | 4.8 ± 0.2 | 3.2 |
| SPRITE† | 5.0 ± 0.4 | 3.3 |
| Ginger Ale+ | 4.2 ± 0.1 | 2.8 |
| Mineral Water# | 4.5 ± 0.1 | 3.0 |

*7-Up ® carbonated beverage, 355 ml can, Seven Up Bottling Company, San Francisco, California.
†SPRITE ® carbonated beverage, 355 ml can, Coca Cola Company, Atlanta, Georgia.
+CANADA DRY ® Ginger Ale, 355 ml can, Seven Up Bottling Company, San Francisco, California.
CRYSTAL GEYSER ® Sparkling Mineral Water, 355 ml bottle, Crystal Geyser Water Company, Calistoga, California.

When the carbonated beverage is exposed to the air, because the partial pressure of carbon dioxide in the earth's atmosphere at sea level is substantially lower than the partial pressure P in the beverage, the carbon dioxide molecules come out of solution by escaping directly through the beverage/air interface. Also, because the overall atmospheric pressure at sea level is less than the pressure in the sealed bottle (or can), upon opening the bottle the carbon dioxide molecules come out of solution by forming bubbles in the beverage. Bubbles nucleate at a surface or in the bulk due to random fluctuations in the density of the dissolved carbon dioxide that brings a large number of carbon dioxide molecules together. Therefore, smaller bubbles are much more likely to nucleate than larger bubbles.

Bubbles tend to nucleate at a surface rather than in the bulk because the pressure inside a bubble with a small volume v can be substantially lower if the bubble forms in a pit or groove in the surface. If a carbonation bubble of radius r forms in the bulk of the beverage, the surface tension $\sigma$ of the interface exerts an additional pressure of $(2\sigma/r)$ on the gas inside the bubble. Therefore, the minimum nucleation radius $r_{nuc-bulk}$ is $$r_{nuc-bulk} = 2\sigma/P, \qquad (4.2)$$

since if the bubble is smaller than $r_{nuc-bulk}$, the pressure inside the bubble is greater than the partial pressure P of carbon dioxide in the liquid, driving the carbon dioxide in the bubble back into solution. However, if the radius of the bubble is greater than $r_{nuc-buljk}$, the bubble will continue to grow as additional carbon dioxide molecules diffuse through the liquid into the bubble. Therefore, for a spherical bubble the minimum nucleation volume $v_{nuc-bulk}$ is $$v_{nuc-bulk} = (32/2) \pi (\sigma/P)^3 \approx 33.5 (\sigma/P)^3. \qquad (4.3)$$

Figure 5:
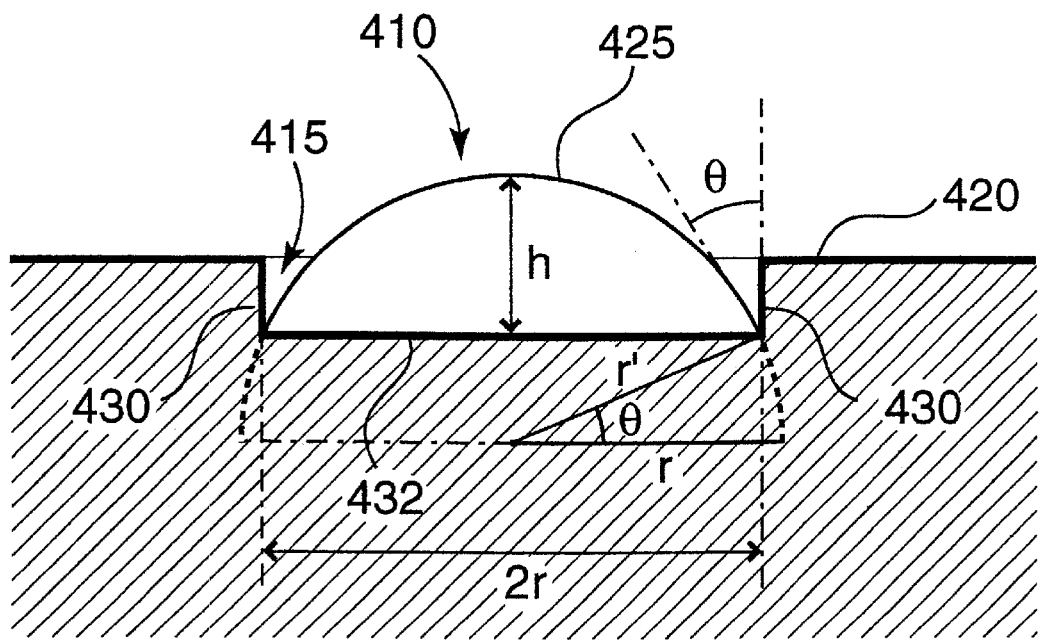
FIG. 5 is a cross-sectional diagram of a bubble nucleating in a cylindrical pit on a surface.

If a bubble nucleates in a pit or groove, such as the cylindrical pit (415) of radius r shown in cross-section in FIG. 5, the radius of curvature r' of the bubble interface (425) will be r/cosθ and the top of the bubble (410) will be a distance $$d = r' - r \tan\theta = r \sec\theta (1 - \sin\theta) \quad (4.4)$$

above the bottom (432) of the pit (415), where θ is the contact angle between the side walls (430) of the pit (415) and the surface (425) of the bubble. The beverage/bubble interface therefore exerts a pressure of $2\pi \cos\theta/r$ on the carbon dioxide inside the bubble, and the bubble can form in the pit (415) if the radius r of the pit (415) is greater than a minimum nucleation radius $r_{nuc-surf}$, where $$r_{nuc-surf} = 2\sigma \cos\theta/P. \quad (4.5)$$

To promote a large bubble coverage h, the confection of the preferred embodiment is manufactured with a surface that is rough on length scales on the order of $[2\sigma \cos\theta/P]$ to promote bubble nucleation. The contact angle θ is a function of the liquid-solid, liquid-gas and solid-gas surface tensions, and for a particular confection θ may be determined by observation, preferably using a microscope or magnifying glass. The surface tension σ for a water/carbon dioxide interface is approximately 80 dynes/cm, and θ is generally in the neighborhood of 45° for a confection in a carbonated beverage. If P is three atmospheres, i.e., approximately $3 \times 10^6$ dynes/cm$^2$, then $r_{nuc-bulk}$ is approximately 40 microns.

From equations (4.4) and (4.5) it is found that the minimum nucleation volume is $$v_{nuc-surf} = (1/3) \pi d^2 (3r'-d) = (1/3) \pi (r_{nuc-surf})^3 \sec^3\theta (1-\sin\theta)^2 (2+\sin\theta) = (8/3) \pi (\sigma/P)^3 (1-\sin\theta)^2 (2+\sin\theta) \quad (4.6)$$

Since θ is generally in the neighborhood of 45°, $v_{nuc-surf}$ is approximately 1.95 $(\sigma/P)^3$. Therefore, the volume of a bubble can be almost two orders of magnitude smaller if it nucleates at a surface instead of in the bulk.

As the carbonation diminishes the partial pressure P of carbon dioxide decreases and the minimum nucleation radius $r_{nuc-surf}$ for the surface increases. The half-life of the carbonation, i.e., the time it takes for half the carbon dioxide to leave the beverage once opened, is typically in the neighborhood of a half hour. Preferably, nucleation is promoted for at least five minutes from the time the beverage is opened and poured into a cup or glass, so the surface is rough on length scales from $[2\sigma \cos\theta/P(0)]$ to $[2\sigma \cos\theta/P(5)]$, where P(t) is the partial pressure of carbon dioxide t minutes after it has been poured. More preferably, nucleation is promoted for at least ten minutes from the time the beverage is opened and poured, so the surface is rough on length scales from $[2\sigma \cos\theta/P(0)]$ to $[2\sigma \cos\theta/P(10)]$. Still more preferably, nucleation is promoted for at least fifteen minutes from the time the beverage is opened and poured, so the surface is rough on length scales from $[2\sigma \cos\theta/P(0)]$ to $[2\sigma \cos\theta/P(15)]$.

If a bubble is growing on a rough surface there will be periods where the shape of the bubble and the region of contact between the bubble and the surface changes abruptly so as to maintain the value θ of the contact angle along the entire contour of contact between the bubble interface and the surface. During these abrupt transitions the bubble is likely to break free from an upward-facing surface due to hydrodynamic forces on the bubble, and variations in the surface tension force binding the bubble to the surface. Therefore, a bubble (once nucleated) is most likely to grow to the upper-limit of bubble size at an arbitrary location when the surface on which it grows is smooth, i.e., the bubble population will have more bubbles with radii near the upper-limit bubble radius R* if the surface is smooth over length scales the the neighborhood of the upper-limit bubble radius R*. In the preferred embodiment the confection is smooth on length scales from 2R*/3 to R*, more preferably from R*/2 to R*, more preferably from R*/3 to R*, more preferably from R*/5 to R*, more preferably from R*/8 to R*, more preferably from R*/13 to R*, more preferably from R*/21 to R*, and still more preferably from R*/30 to R*.

It should be understood that to determine the smoothness of a surface it is not enough to simply measure deviations in the 'height' of a surface. Rather, a length along the surface must also be specified. For instance, a lake in a light wind is smooth on a length scale of miles (since a lake seen from far away is flat), yet rough on a length scale of the distance between the ripples, yet smooth on a length scale of a millimeter (since any square millimeter section is basically flat, although it may not be level). Therefore, if a surface portion of the article is smooth on a length scale of R*, then height deviations on an R* by R* section of the surface are substantially smaller than R*. Or equivalently, a surface is considered smooth at a particular length scale λ if the integral of the Fourier amplitudes over a region of width λ centered about the wavelength λ is small relative to the wavelength λ.

The upper-limit bubble radius R* on a surface is determined by the surface tension σ of the bubble interface, and the contact angle θ between the surface and the bubble interface. On a perfectly smooth upward-facing surface the buoyancy of the truncated spherical bubble is just balanced by the surface tension binding the bubble to the surface, so $$\{\rho\, g\, \pi\, R^{*3}/3\}[4-(1-\cos\theta)^2 (2+\cos\theta)] = 2\, \pi\, R^*\, \sigma \sin^2\theta. \quad (4.7)$$

Solving for the upper-limit bubble radius R* provides $$R^* = \{6\, \sigma \sin^2\theta/\rho g\, [4-(1-\cos\theta)^2 (2+\cos\theta)]\}^{1/2}. \quad (4.8)$$

In an alternate embodiment of the present invention, rather than texturing the entire surface of the confection to maximize the steady-state bubble coverage h(∞), only a portion of the surface is textured to maximize h(∞), so that the textured portion will lead when the confection ascends to the surface of the beverage. For instance, if the confection has a marine-related shape, such as the shape of a whale, the front portion of the whale is textured to increase h(∞) (or the rear portion is textured to decrease h(∞)), so that the whale will rise through the beverage head first. (However, such selective texturing will not insure that the confection will descend with the textured end leading.)

Criteria to Avoid Stacking

In a first preferred embodiment of the present invention the confections are large enough that their shapes are easily discernible from approximately 20–30 cm away, and there is a sufficient number of confections in the beverage that at least one confection is usually in motion at any instant. However, if the confections are too large, or if too many confections are put in the beverage, the confections would interfere with the swimming motions of each other. For instance, if the top surface of the beverage is crowded with confections then a rising confection may not be able to reach the air/beverage interface, and the bubbles on the confection would therefore not be able to escape into the air. Then, both the rising confection and the confection directly above it would be prevented from descending. Similarly, if the bottom of the beverage is crowded with confections, then a first descending confection may come to rest on a second confection resting at the bottom. The weight of the first confection might then prevent the second confection from rising, and formation of carbonation bubbles in the region of contact between the two confections may be inhibited. Abutting confections at the top or bottom surface of the beverage will be referred to as "stacked" confections. Optimally, a compromise is reached between having (i) confections large enough that their shapes are easily discernible, (ii) a sufficient number of confections that one or more confections are usually in motion, and (iii) few enough confections of a small enough size that stacking is avoided.

Suppose that there are N confections in a cup and the confections are designed to spend, on average, a fraction p of the cycle time at the top of the beverage, a fraction q of the cycle time at the bottom of the beverage, and a fraction s of the cycle time in transit between the top and the bottom, where p+q+s=1. Then the probability of a given number of confections being at the top, the bottom, or in transit is given by the binomial distribution, and on average there are pN confections at the top of the beverage, qN confections at the bottom of the beverage, and sN confections in transit.

Stacking at the top surface of the beverage tends to be avoided when the average number of confections at the top surface, multiplied by the average impact area per confection Z and divided by a correction factor $\mu$, is less than or approximately equal to the area $C_{top}$ at the top surface of the beverage, i.e., $$N \leq \mu \, C_{top}/p \, Z. \tag{5.1}$$

Similarly, stacking at the bottom of the beverage tends to be avoided when the average number of confections at the bottom, multiplied by the average impact area per confection Z and divided by the correction factor $\mu$, is less than or approximately equal to the area $C_{bot}$ of the bottom inside surface of the cup, i.e., $$N \leq \mu \, C_{bot}/q \, Z. \tag{5.2}$$

In the preferred embodiment both equations (5.1) and (5.2) are satisfied, so stacking is avoided at both the top and bottom surfaces of the beverage. Because the number N of confections is maximized when both p and q are small, i.e., when the confections spend much of the cycle time in transit between the top and bottom surfaces of the beverage, in the preferred embodiment s>p or s>q, and more preferably s>p and s>q. Also, a cup or glass with a bottom surface area $C_{bot}$ that is considerably smaller than the top surface area $C_{top}$ is to be avoided, since the condition of equation (5.2) will then be considerably more restrictive than the condition of equation (5.1) if p is approximately equal to q.

Figure 6A:
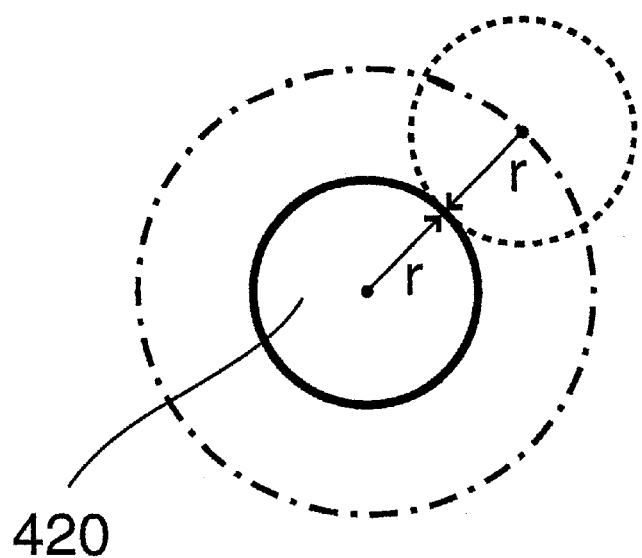
FIGS. 6A and 6B shows the impact area for disks of radius r.

The impact area for two thin coplanar confections in an infinite cup is defined as follows: when the center of a first confection is within the impact area surrounding a second confection, the two confections are in contact. As shown in FIG. 6A, the impact area (410) of a thin circular confection (or a confection with a circular cross section) with a radius r is $4 \pi r^2$, ie., four times the area (420) of a single confection.

Figure 6B:
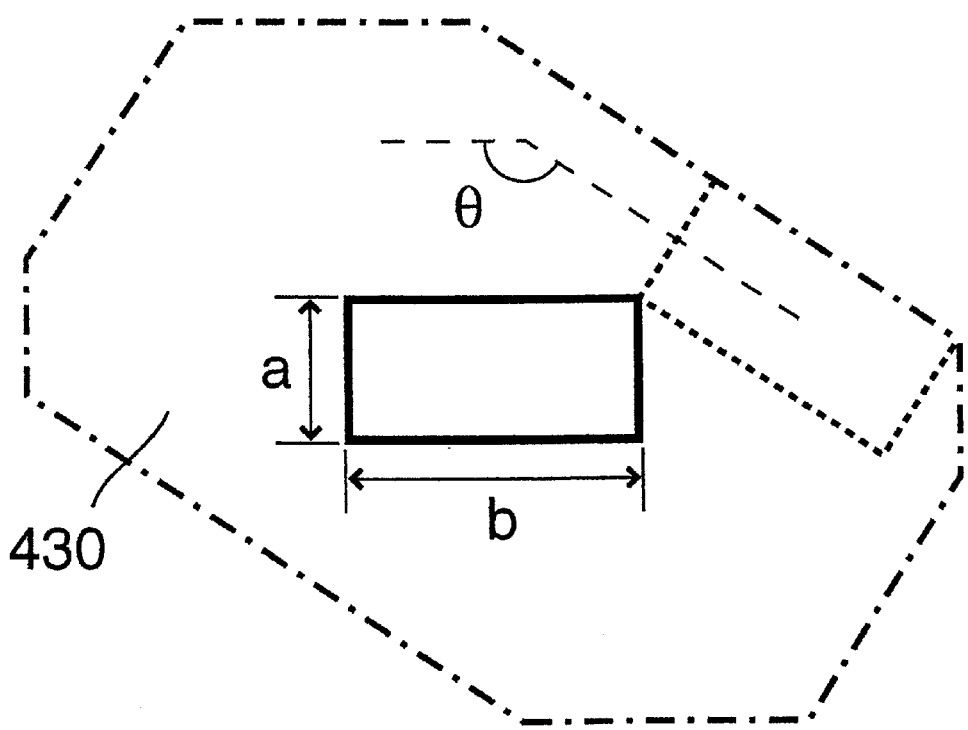

For noncircular confections the impact area will depend on the angular orientation of the confections. FIG. 6B shows the octagonal impact area (430) of two thin coplanar rectangular confections (or two confections with rectangular cross sections) with sides of length a and b, with longitudinal axes separated by an angle θ. The impact area as a function of angle Z (θ) is given by $$Z(\theta)=(a+a \cos \theta+b \sin \theta)(b+b \cos \theta+a \sin \theta)-b^2 \sin \theta/\theta \cos \theta-a^2 \sin \theta \cos \theta=2\,ab+(a^2+b^2)\sin \theta+2\,ab \cos \theta, \tag{5.3}$$

and the angular average of the impact area is $$Z=2\,ab\,[1+(2+e+1/e)\pi], \tag{5.4}$$

where e=b/a is the aspect ratio of the confection. For an irregularly-shaped confection, a and b are the characteristic length and the characteristic width of the confection.

The correction factor $\mu$ may be considered to be a product of a geometric correction factor $\mu_g$ and a tolerance factor $\mu_t$, i.e., $$\mu=\mu_g*\mu_t. \tag{5.5}$$

The value of the tolerance factor $\mu_t$ depends on the degree of stacking which is considered acceptable. The geometric correction factor $\mu_g$ compensates for a number of effects, including: the impact areas of the confections are likely to overlap, thereby providing a total impact area which is less than the sum of the individual impact areas; and the shape and finite size of the cup or glass will require the need for "finite-size corrections." The geometric correction factor $\mu_g$ for the top surface of the beverage is a function of the number of confections N, the probability p of a confection being at the top of the beverage, the area $C_{top}$ of the top surface of the beverage, and the impact area Z. Similarly, the geometric correction factor $\mu_g$ for the bottom surface of the beverage is a function of the number of confections N, the probability q of a confection being at the bottom of the beverage, the area $C_{bot}$ of the bottom surface of the beverage, and the impact area Z. Empirically, it has been found that preferably $0.5<\mu<6$, more preferably $1<\mu<4$, more preferably $1.5<\mu<3$, more preferably $2.0<\mu<2.5$, and most preferably $\mu \approx 2.25$.

For example, thin confections with characteristic dimensions of a=2.2 cm and b=1.1 cm have an impact area of 11.8 cm². Most cups and glasses have an inside radius close to 3.5 cm, so $C_{top}=C_{bot}\approx 38.5$ cm². If the value of the correction factor $\mu$ is taken to be 2.25, and on average 40% of the confections are at the top of the beverage, 30% of the confections are at the bottom of the beverage, and 30% of the confections are in transit between the top and bottom of the beverage, then the optimum number of confections is determined by equations (5.1) and (5.2) to be limited to eighteen to avoid stacking.

Other Details of the Preferred Embodiments

The carbonated beverage to be used with the confections according to the present invention is translucent, preferably transparent, and remains carbonated for at least five minutes, more preferably ten minutes, and even more preferably fifteen minutes. To allow the confections to reach the top surface of the beverage so that bubbles on the confections can escape into the air, the beverage should not have ice in it.

The confections are soft and flexible so as not to present a choking hazard or injure the throat if inadvertently swallowed. The rate of nucleation of carbon dioxide bubbles should not substantially decline with time, and the ability of the bubbles to adhere to the surface of the confection should not substantially degrade with time, over a period of five minutes, more preferably ten minutes, and even more preferably fifteen minutes.

Forming the 'swimming' confections with the shapes of recognizable objects, preferably recognizable objects associated with movement (i.e., recognizable "kinetic" objects), produces a dramatic synergy. According to the lexography of the present specification, a "recognizable shape" is a shape which is generally associated with a particular type of object by most people. Similarly, a "shape of a recognizable object" is a shape which is generally associated with a particular type of object by most people. The confections may have the shapes of animals, plants, fantasy characters, cartoon characters, man-made objects, naturally-occurring objects, human figures, animal figures, etc. having shapes which are generally recognizable. In the case of thin and/or flat 'swimming' confections, the confections have the shapes of silhouettes of the recognizable objects. The confections can be imagined to have characters, personalities and motivations associated with their shapes, and all sorts of dramas and adventures can be imagined. In a preferred embodiment of the present invention the confections have the shapes of marine-related animals, vehicles, humans and fantasy characters, particularly underwater marine-related entities such as mermaids, scuba divers, deep-sea divers, submarines, sharks, octopuses, squid, whales, swordfish, turtles, crabs, etc. In the case of thin and/or flat 'swimming' confections, the confections have the shapes of silhouettes of the recognizable objects. It should be noted that thin confections obeying the conditions discussed above can provide substantially larger cross-sectional areas than confections which are not thin. Therefore, the shapes of thin confections can be much more easily discernible than the shapes of confections which are not thin.

For a pleasing appearance the group of confections have a variety of bright colors. To prevent the confections from imparting an unappetizing brown color to the beverage as they dissolve, complementary colors from the subtractive color wheel (e.g. red and green, or blue and orange) are to be avoided. In the preferred embodiment the confections are predominantly colored red, orange and yellow, and the respective complementary colors (green, blue, and purple) occur infrequently.

The rate of nucleation of carbon dioxide bubbles should not substantially decline with time, and the ability of the bubbles to adhere to the surface of the confection should not substantially degrade with time, over a period of five minutes, more preferably ten minutes, and even more preferably fifteen minutes. Also, confections which "muddy" the beverage (i.e., decrease the transparency or transluscency of the beverage) when submerged therein, such as toffees and marzipans, should not be used since they impart an unappetizing appearance to the beverage. Gelatin-based confections, i.e., confections made by incorporating a sugar syrup into a gelatin solution and allowing the mixture to solidify, having a composition similar to Trolli Gummi confections (distributed by GPA Incorporated of St. Louis, Mo.) are most preferred because of their appearance and rubbery consistency.

A low solubility confection is preferred because the dimensions and the bubble coverage function h(t) are relatively invariant with length of time the confection has been submerged, and the confection has little effect on the level of carbonation and the color of the beverage. The solubility of the confections is preferably less than 20 grams per 100 milliliters of water, more preferably less than 10 grams per 100 milliliters of water, even more preferably less than 3 grams per 100 milliliters of water, still more preferably less than 1 gram per 100 milliliters of water, and still more preferably less than 0.3 grams per 100 milliliters of water.

CONCLUSION

Thus, it will be seen that the improvements presented herein, consistent with the objects of the invention for the confection that swims in a carbonated beverage, provides a confection which (i) has a large number of cycles of ascension and descension per unit time;

(ii) has a surface texture that promotes a large volume of bubbles per unit surface area by facilitating bubble nucleation and retaining large bubbles;

(iii) has a recognizable shape and a large enough cross section that the shape is easily discernible;

(iv) is soft so as not to present a choking danger or injure the throat if swallowed; and (v) is made of ingredients which do not "muddy" the beverage.

Furthermore, a group of such confections is provided which (vi) has a cardinality which is large enough that at least one confection is usually in motion at any instant; the cardinality and the cross-sectional area being not so large that stacking of the confections is likely to occur at the top and bottom of the beverage.

Low solubility confections, particularly gelatin-based confections, are preferred because (vii) their dimensions are relatively invariant with length of time the confection has been submerged;

(viii) the bubble coverage function h(t) is relatively invariant with length of time the confection has been submerged;

(ix) they have little effect on the level of carbonation of the beverage;

(x) they have little effect on the color of the beverage;

(xi) they have an appealing appearance when suspended in a transparent beverage; and (xii) they have an appealing rubbery consistency.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable those skilled in the art to best utilize the invention and various embodiments with various modifications as are suited to the particular use contemplated. Many other variations are possible. For example: the liquid may be supersaturated with a gas other than carbon dioxide; the confection may promote nucleation of bubbles by dissolving quickly and thereby inducing the release of carbon dioxide bubbles from the supersaturated solution; a non-edible material or chewing gum may be substituted for the confectionery material; the edible confection may or may not include sugar as an ingredient, and may include flavorings, such as citric acid, to alter the flavor of the beverage as the confection dissolves, or may be relatively tasteless (i.e., according to the lexography of the present specification, the "edible confection" need only satisfy the condition of being edible); a confection may be produced having a specific gravity close to unity by (i) including ingredients with a specific gravity close to unity, such as carnauba wax, or (ii) using whipped eggs, or vinegar and baking soda, or the like, in the recipe to produce a foamed structure; a confection may have a shape such that the cross-section along an axis perpendicular to the longitudinal axis of the confection has more area to the aft of the center of gravity than to the fore, so that hydrodynamic forces will cause the confection to swim "head first"; a confection may be more soluble at a front region than a rear region, thereby promoting more nucleation in the front region so that the confection ascends "head first"; the density of a confection may be nonhomogeneous so that as it dissolves in the beverage and its volume and surface area decrease, it remains within the bounds which allow it to ascend and descend; the confection may be a suspension of a first confectionery material in a second confectionery material, where the first and second confectionery materials have different rates of dissolving, so that the surface texture of the confection is rough on small length scales throughout the dissolving process to promote bubble nucleation; the crane for measuring the bubble coverage need not have a cross-arm; the crane for measuring the bubble coverage need not be made of wood; etc.

Furthermore, the description of the physical principles underlying the operation and performance of the present invention are also presented for purposes of illustration and description, and are not intended to be exhaustive or limiting. It should be understood that these descriptions include many approximations, simplifications and assumptions to present the basic concepts in a mathematically tractable form, and many effects which influence the operation and performance are neglected for ease of presentation. For instance: the specific gravity of carbonated beverages such as sodas is not exactly unity, and the specific gravity will vary as the carbonation leaves the beverage; the effects of carbonation bubbles on the side surfaces of thin confections is neglected; carbon dioxide gas has a nonzero specific gravity: carbonation bubbles attached to the surface of a confection are not exactly spherical; the plot of activity as a function of confection thickness may not have plateaus, or may have more than or less than three plateaus; the ascension condition, the overall effectiveness ratios, and the geometric effectiveness ratios are dependent on the bubble coverage as a function of time and the angle of orientation of the surface, and not just on the steady-state value thereof for an upward-facing horizontal surface; the descension condition is dependent on the volume of bubbles per unit area as a function of time and the angle of orientation of the surface, and not just on the value thereof for a downward-facing horizontal surface after one cycle; the ascension condition is dependent on the volume of bubbles per unit area when a surface of the confection is in contact with the container of the beverage; the bubbles coverage as a function of time and the angle of orientation of the surface is dependent on the carbonation level of the beverage; the bubble coverage as a function of time and the angle of orientation of the surface is dependent on the length of time the confection has been exposed to moisture (typically the moisture of the beverage); the limit of the number of confections which can be used while still avoiding stacking at the top or bottom of the beverage may also be a function of the cross-sectional area of the confections and the standard deviations of the number of confections at the top or bottom of the beverage; etc.

Accordingly, it is intended that the scope of the invention should be determined not by the embodiments illustrated or the physical analyses motivating the illustrated embodiments, but rather by the appended Claims and their legal equivalents.

What is claimed is:

1. A set of articles for submersion in a carbonated beverage, each of the articles being formed in a recognizable shape selected from the group consisting of shapes of human figures, animal figures, marine-related shapes, fantasy characters, cartoon characters and vehicles and having a specific gravity $\beta$, a volume V, and a surface area A, such that $$0<(\beta-1)V/A\ h(\infty)<1$$

where $h(\infty)$ is a steady-state volume per unit area occupied by carbonation bubbles attached to said surface area A when the articles are submerged in said carbonated beverage, each of the articles sinking in said carbonated beverage when none of said carbonation bubbles are attached thereto, and each of the articles floating in said carbonated beverage when said carbonation bubbles attach thereto.

2. The set of the articles of claim 1 wherein said recognizable shapes of said articles are associated with movement.

3. The set of the articles of claim 1 wherein said recognizable shapes are recognizable marine-related shapes.

4. The set of the articles of claim 3 wherein said recognizable marine-related shapes are selected from a group consisting of mermaids, scuba divers, deep-sea divers, submarines, sharks, octopuses, squid, whales, swordfish, turtles, and crabs.

5. The set of the articles of claim 1 wherein said recognizable shapes of said articles are silhouettes.

6. A set of articles of cardinality N for submersion in a carbonated beverage, each of the articles having a specific gravity $\beta$ and being substantially thin with a thickness T across a first direction, a width $W_1$ across a second direction, a length $W_2$ across a third direction, said first, said second and said third directions being orthogonal, such that $$0<(\beta-1)T/h(\infty)<1,$$

where $h(\infty)$ is a steady-state volume per unit area occupied by carbonation bubbles attached to the articles when submerged in said carbonated beverage, said each of the articles sinking in said carbonated beverage when none of said carbonation bubbles are attached thereto, and said each of the articles floating in said carbonated beverage when said carbonation bubbles attach thereto.

7. The set of the articles of claim 6 wherein said cardinality N is one, and said thickness T is bounded by $$T<H(W_1\times W_2)/(W_1+W_2),$$

where $0<H<½$.

8. The set of the articles of claim 7 wherein $0<H<⅓$.

9. The set of the articles of claim 6 wherein the articles have shapes of silhouettes of recognizable objects.

10. The set of the articles of claim 6 wherein said thicknesses T are between 45% and 100% of a maximum thickness $T_{max}$ which the articles can have and still be able to ascend, where $$T_{max}=2\ h(\infty)/(\beta-1).$$

11. The set of the articles of claim 10 wherein said thicknesses T are between 75% and 95% of said maximum thickness $T_{max}$.

12. The set of the articles of claim 6 wherein said cardinality N is greater than one, and, for substantially all of the set of the articles, said thickness T is bounded by $$T<H(W_1\times W_2)/(W_1+W_2),$$

where $0<H<½$.

13. The set of the articles of claim 12 wherein said each of the articles has an impact area given by $$2\ W_1W_2[1+\{2+(W_1/W_2)+(W_2/W_1)\}/\pi],$$

the set of the articles has an average impact area Z, and said cardinality N of the set is $$N=96.25 \text{ cm}^2/Z.$$

14. The set of the articles of claim 12 where said cardinality N of the set is 18.

15. The set of the articles of claim 12 wherein substantially all articles for said submersion in said carbonated beverage are in the set.

16. A set of articles for submersion in a carbonated beverage, each of the articles having a specific gravity $\beta$, and being substantially flat with a thickness T across a first direction, a width $W_1$ across a second direction, and a length $W_2$ across a third direction, a volume V, a surface area A, and a steady-state volume per unit area $h(\infty)$ occupied by attached carbonation bubbles when submerged in said carbonated beverage, said first, said second and said third directions being orthogonal, such that $$0<(\beta-1)V/A\ h(\infty)<1,$$

said each of the articles sinking in said carbonated beverage when none of sid carbonation bubbles are attached thereto, and said each of the articles floating in said carbonated beverage when said carbonation bubbles attach thereto.

17. The set of the articles of claim 16 wherein the set has a cardinality of at least one, and $$T<W_1[1-(1-F)G^{(W_2-W_1)/W_1}],$$

where $0 \leq F \leq \frac{1}{4}$ and $\frac{3}{4} \leq G \leq 1$.

18. The set of the articles of claim 17 wherein the set has a cardinality greater than one, and $$T<W_1[1-(1-F)G^{(W_2-W_1)/W_1}],$$

where $0 \leq F \leq \frac{1}{4}$ and $\frac{3}{4} \leq G \leq 1$.

19. The set of the articles of claim 17 wherein, for each of the articles $$T>h(t_c)/(\beta-1),$$

where $h(t_c)$ is a volume of said carbonation bubbles per unit area after a cycle time $t_c$ required for an ascension and descension in said carbonated beverage, so that said each of the articles descends when said carbonation bubbles leave a top surface thereof.

20. The set of the articles of claim 16 wherein substantially all the articles in the set satisfy $$T<W_1[1-(1-F)G^{(W_2-W_1)/W_1}],$$

where $0 \leq F \leq \frac{1}{3}$ and $\frac{1}{2} \leq G \leq 1$, and the set has a cardinality N of at least 18.

21. The set of the articles of claim 16 wherein substantially all articles for said submersion in said carbonated beverage are the articles in the set, and substantially all the articles in the set satisfy $$T<W_1[1-(1-F)G^{(W_2-W_1)/W_1}],$$

where $0 \leq F \leq \frac{1}{3}$ and $\frac{1}{2} \leq G \leq 1$.

22. The set of the articles of claim 16 wherein substantially all of the articles in the set satisfy $$T<W_1[1-(1-F)G^{(W_2-W_1)/W_1}],$$

where $0 \leq F \leq \frac{1}{3}$ and $\frac{2}{3} \leq G \leq 1$, said each of the articles has an impact area given by $$2\ W_1W_2[1+\{2+(W_1/W_2)+(W_2/W_1)\}/\pi],$$

the set of the articles has an average impact area Z, and said cardinality N of the set is $$N=96.25 \text{ cm}^2/Z.$$

23. A set of articles for submersion in a carbonated beverage, the articles having an average specific gravity $\beta$, an average thickness T, and an average steady-state bubble volume per unit area $h(\infty)$ occupied by carbonation bubbles attached to the articles when submerged in said carbonated beverage, such that $$0<(\beta-1)T/h(\infty)<1,$$

the articles having thickness variations of $\Delta T$, density variations of $\Delta\beta$, and steady-state bubble volume per unit area variations of $\Delta h(\infty)$, an overall relative accuracy, $\Delta\Pi$, being given by $$\{[\Delta T/T]^2+[\Delta h(\infty)/h(\infty)]^2+[\Delta\beta/(\beta-1)]^2\}^{1/2},$$

and condition $$(\beta-1)T/2\ h(\infty)\ [1+\Delta\Pi]<1,$$

being satisfied so that substantially all of the articles ascend in said carbonated beverage when said carbonation bubbles attach to the articles.

24. The set of the articles of claim 23 wherein said overall relative accuracy $\Delta\Pi$ is less than 10%.

25. The set of the articles of claim 24 wherein said overall relative accuracy $\Delta\Pi$ is less than 5%.

26. The set of the articles of claim 23 wherein said overall related accuracy $\Delta\Pi$ is greater than approximately 18%, a maximum thickness $T_{max}$ which said each of the articles can have and still be able to ascend is given by $$T_{max}=2\ h(\infty)/(\beta-1),$$

and said average thickness T is approximately equal to $T_{max}/(1+\Delta\Pi)$.

27. The set of the articles of claim 23 wherein substantially all articles for said submersion in said carbonated beverage are in the set.

28. The set of the articles of claim 24 wherein said average thickness T is approximately 85% of a maximum thickness $T_{max}$ which the articles can have and still be able to ascend given by $$T_{max}=2h(\infty)/(\beta-1).$$

29. An article for submersion in a carbonated beverage, the article having a specific gravity $\beta$, a volume V, and a surface area A, such that $$0<(\beta-1)V/A\ h(\infty)<1,$$

where $h(\infty)$ is a steady-state bubble volume per unit surface area occupied by carbonation bubbles attached to said surface area A when the article is submerged in said carbonated beverage, the article floating in said carbonated beverage when said carbonation bubbles attach to the article, and the article sinking in said carbonated beverage when none of said carbonation bubbles are attached to the article, a substantial portion of said surface area A is smooth on a length scale of an upper-limit bubble dimension R of said carbonation bubbles, so that said substantial portion of said surface area A promotes a large value of said steady-state bubble volume per unit surface area $h(\infty)$ occupied by said carbonation bubbles.

30. The article of claim 29 wherein said upper-limit bubble dimension R is an upper-limit bubble radius R* for an optimally smooth surface texture is given by $$R^* = \{6\sigma \sin^2\theta/\rho g[4-(1-\cos\theta)^2(2+\cos\theta)]\}^{1/2},$$

where $\sigma$ is a surface tension of a bubble interface between said carbonated beverage and carbon dioxide, $\theta$ is a contact angle between said surface portion and said bubble interface, and g is acceleration due to gravity.

31. The article of claim 30 wherein said substantial portion of said surface area A is smooth on length scales between $R^*/3$ and $R^*$.

32. The article of claim 29 wherein said surface texture is rough on a length scale of $[2\sigma\cos\theta/P]$, where $\sigma$ is a surface tension of a bubble interface between said carbonated beverage and carbon dioxide, $\theta$ is a contact angle between said surface portion and said bubble interface, and P being a partial pressure of dissolved carbon dioxide in said carbonated beverage.

33. The article of claim 29 wherein said upper-limit bubble dimension R has a value of 1.1 mm.

34. The article of claim 29 wherein said upper-limit bubble dimension R has a value of 1.3 mm.

35. The article of claim 29 wherein said upper-limit bubble dimension R has a value of 1.5 mm.

36. The article of claim 29 wherein said upper-limit bubble dimension R has a value of 2.5 mm.

37. A method for providing an amusement system for use with a carbonated beverage, comprising the steps of:

confecting, using multiple ingredients, an edible confection having specific gravity $\beta$;

shaping said edible confection into articles, each of said articles having a specific volume V, a surface area A, and a steady-state volume per unit area $h(\infty)$ occupied by carbonation bubbles attached to said surface area A, such that $$0 < (\beta-1)V/A\, h(\infty) < 1,$$

said each of the articles sinking in said carbonated beverage when none of said carbonation bubbles are attached thereto, and said each of the articles floating in said carbonated beverage when said carbonation bubbles attach thereto; and providing a container containing a total number N of said articles, each of said articles in said container having a width $W_1$, a length $W_2$, and an impact area given by $$2\,W_1 W_2[1+\{2+(W_1/W_2)+(W_2/W_1)\}/\pi],$$

said articles in aid container having an average impact area Z, and said total number N of articles in said container being given by $$N = 128.33\text{ cm }\mu/Z,$$

where $2.0 < \mu < 2.5$.

38. The method of claim 37 wherein a surface texture of said edible confection is substantially invariant during a period of submersion in said carbonated beverage, said period of submersion being at least five minutes.

39. The method of claim 37 wherein said steady-state bubble volume per unit area $h(\infty)$ is substantially invariant during a period of submersion in said carbonated beverage, said period of submersion being at least five minutes.

40. The method of claim 37 wherein said specific gravity $\beta$ is substantially invariant during a period of submersion in said carbonated beverage, said period of submersion being at least five minutes.

41. The method of claim 37 wherein said surface area A is substantially invariant during a period of submersion in said carbonated beverage, said period of submersion being at least five minutes.

* * * * *

UNITED STATES PATENT AND TRADEMARK OFFICE
CERTIFICATE OF CORRECTION

PATENT NO.   : 6,319,535 B1
DATED        : November 20, 2001
INVENTOR(S)  : Laurence J. Shaw It is certified that error appears in the above-identified patent and that said Letters Patent is hereby corrected as shown below:

Title page,
Item [63], Related U.S. Application Data, for priority under 35 U.S.C. 120 based on non-provisional patent applications, substitute -- filed on Nov. 26, 1996 -- for "filed on Nov. 26, 1998".

Drawings,
Figure 3, insert attached as the following sheet, with the figures in the above identified patent.

Column 7,
Line 65, equation (2.1), substitute -- $\beta_g$ -- for "βg".
Line 65, equation (2.1), substitute -- $\beta_l$ -- for "βl".
Line 67, substitute -- $\beta_l$ -- for "βl".
Line 67, substitute -- $\beta_g$ -- for "βg".

Column 8,
Line 10, substitute -- $\beta_l$ -- for "βl".
Line 10, subsitute -- $\beta_g$ -- for "βg".
Line 12, substitute -- $\beta_l$ -- for "βl".

Column 9,
Line 35, equation (2.10), substitute
-- $(\beta - 1) T / 2 h(\infty) \times \{ 1 + [ (\Delta T/T)^2 + (\Delta h(\infty) / h(\infty))^2 + (\Delta\beta /(\beta-1))^2 ]^{1/2} \} < 1$ -- for
"$(\beta - 1) T / 2 h(\infty) \times \{ 1 + [ (\Delta T/T)^2 + (\Delta h(\infty) / h(\infty))^2 + (\Delta\beta /(\beta-1))_2 ]^{1/2} \} < 1$".

Column 14,
Line 66, equation (4.3), substitute
-- $v_{nuc\text{-}bulk} = (32/3) \pi (\sigma/P)^3 \approx 33.5 (\sigma/P)^3$ -- for "$v_{nuc\text{-}bulk} = (32/2) \pi (\sigma/P)^3 \approx 33.5 (\sigma/P)^3$".

UNITED STATES PATENT AND TRADEMARK OFFICE
CERTIFICATE OF CORRECTION

PATENT NO. : 6,319,535 B1
DATED : November 20, 2001
INVENTOR(S) : Laurence J. Shaw It is certified that error appears in the above-identified patent and that said Letters Patent is hereby corrected as shown below:

Column 18,
Line 1, equations (5.3), substitute
-- $Z(\theta) = (a + a \cos \theta + b \sin \theta)(b + b \cos \theta + a \sin \theta) - b^2 \sin \theta \cos \theta$
    $-a^2 \sin \theta \cos \theta$
    $= 2ab + (a^2 + b^2) \sin \theta + 2ab \cos \theta$, -- for
"$Z(\theta) = (a + a \cos \theta + b\ sin\ \theta)(b + b \cos \theta + a \sin \theta) - b^2 \sin \theta/\theta \cos \theta$
    $-a^2 \sin \theta \cos \theta$
    $= 2ab + (a^2 + b^2) \sin \theta + 2ab \cos \theta$"
Line 5, equation (5.4), substitute
-- $Z = 2ab[1 + (2 + e + 1/e)/\pi]$ -- for "$Z = 2ab[1 + (2 + e + 1/e)\pi]$"

Column 23,
Line 23, substitute -- said -- for "sid".

Column 24,
Line 19, substitute -- $[(\Delta T/T^2 + (\Delta h(\infty)/h(\infty))^2 + (\Delta\beta/(\beta-1))^2]^{1/2}$ -- for
-- $[(\Delta T/T)^2 + (\Delta h(\infty)/h(\infty))^{2+(\Delta\beta/(\beta-1))^2}]^{1/2}$ --.
Line 32, substitute -- relative -- for "related".

Column 26,
Line 17, substitute -- said -- for "aid".
Line 21, substitute -- $N = 128.33\ cm^2\ \mu/Z$ -- for "$N = 128.33\ cm\ \mu/Z$".

Signed and Sealed this

Twelfth Day of November, 2002

Attest:

JAMES E. ROGAN
*Attesting Officer*   *Director of the United States Patent and Trademark Office*